(12) United States Patent
Tong et al.

(10) Patent No.: US 11,869,141 B2
(45) Date of Patent: Jan. 9, 2024

(54) AUTOMATIC POINT CLOUD VALIDATION FOR IMMERSIVE MEDIA

(71) Applicant: INTEL CORPORATION, Santa Clara, CA (US)

(72) Inventors: Xiaofeng Tong, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 154 days.

(21) Appl. No.: 17/436,481

(22) PCT Filed: May 14, 2019

(86) PCT No.: PCT/CN2019/086794
§ 371 (c)(1),
(2) Date: Sep. 3, 2021

(87) PCT Pub. No.: WO2020/227918
PCT Pub. Date: Nov. 19, 2020

(65) Prior Publication Data
US 2022/0172429 A1      Jun. 2, 2022

(51) Int. Cl.
*G06T 17/00*       (2006.01)
*G06T 7/70*        (2017.01)
*G06V 10/20*       (2022.01)

(52) U.S. Cl.
CPC ............... *G06T 17/00* (2013.01); *G06T 7/70* (2017.01); *G06V 10/255* (2022.01); *G06T 2200/08* (2013.01)

(58) Field of Classification Search
None
See application file for complete search history.

(56) References Cited

U.S. PATENT DOCUMENTS

| 9,747,668 B2 | 8/2017 | Yucer et al. |
| 10,217,234 B2 | 2/2019 | Lee et al. |
| 2004/0189686 A1* | 9/2004 | Tanguay, Jr. ........ G06F 15/7867 345/420 |
| 2009/0271398 A1* | 10/2009 | Scherf ..................... G11B 27/11 707/999.005 |

(Continued)

FOREIGN PATENT DOCUMENTS

| CN | 103971404 | 8/2014 |
| CN | 109087395 | 12/2018 |

(Continued)

OTHER PUBLICATIONS

International Preliminary Report on Patentability for PCT Application No. PCT/CN2019/086794, dated Nov. 25, 2021.

(Continued)

*Primary Examiner* — Anh-Tuan V Nguyen
(74) *Attorney, Agent, or Firm* — Essential Patents Group, LLP

(57) ABSTRACT

Techniques related to validating an image based 3D model of a scene are discussed. Such techniques include detecting an object within a captured image used to generate the scene, projecting the 3D model to a view corresponding to the captured image to generate a reconstructed image, and comparing image regions of the captured and reconstructed images corresponding to the object to validate the 3D model.

19 Claims, 10 Drawing Sheets

(56) References Cited

U.S. PATENT DOCUMENTS

| | | | |
|---|---|---|---|
| 2009/0284527 A1 | 11/2009 | Ofek et al. | |
| 2011/0267344 A1* | 11/2011 | Germann | G06V 20/64 |
| | | | 382/154 |
| 2015/0009212 A1* | 1/2015 | Tan | H04L 65/75 |
| | | | 345/419 |
| 2016/0227181 A1* | 8/2016 | Ilic | G06V 30/224 |
| 2017/0213070 A1* | 7/2017 | Aghamohammadi | |
| | | | G05D 1/0274 |
| 2017/0249438 A1* | 8/2017 | Jain | G16H 20/30 |
| 2018/0005055 A1* | 1/2018 | Jeong | G06V 20/58 |
| 2018/0075592 A1 | 3/2018 | White et al. | |
| 2019/0191146 A1 | 6/2019 | Koyama et al. | |
| 2019/0323844 A1* | 10/2019 | Yendluri | G01C 21/28 |
| 2019/0353477 A1* | 11/2019 | Zheng | G06T 7/586 |
| 2021/0123717 A1* | 4/2021 | Wierda | G01B 21/04 |

FOREIGN PATENT DOCUMENTS

| | | |
|---|---|---|
| CN | 109269405 | 1/2019 |
| CN | 109661812 | 4/2019 |

OTHER PUBLICATIONS

International Search Report and Written Opinion for PCT Application No. PCT/CN2019/086794, dated Feb. 3, 2020.

"Technology in Sports", retrieved online May 4, 2020, via https://www.topendsports.com/resources/tecchnology.htm; 5 pages.

Girshick, R., et al., "Rich feature hierarchies for accurate object detection and semantic segmentation", Tech report (v5); CVPR, 2014.

"HAWKEYE", retrieved online May 4, 2020, via https://www.hawkeyeinnovations.com/products/ball-tracking.

Hu, P., et al., "Finding tiny faces", CVPR, 2017.

Redmon, J., et al., "You only look once: Unified, real-time object detection", CVPR, 2016.

Ren, S., et al., "Faster r-cnn: Towards realtime object detection with region proposal networks", NIPS, 2015.

Van Etten, A., "You Only Look Twice: Rapid multi-scale object detection in satellite imagery", CVPR, 2018.

Extended European Search Report for European Patent Application No. 19929054.5, dated Dec. 20, 2022.

Ding, W., et al., "Vehicle Pose and Shape Estimation through Multiple Monocular Vision", ARXIV.org, Cornell University Library, Feb. 10, 2018.

Kim, J., et al., "Segment-Based Foreground Extraction Dedicated to 3D Reconstruction", 2010 20th International Conference on Pattern Recognition (ICPR 2010), Istanbul Turkey, Aug. 23-26, 2010.

Zarean, A., et al., "Human body 3D reconstruction in multiview soccer scenes by depth optimization", 2016 24th Iranian Conference on Electrical Engineering (ICEE), May 10, 2016.

\* cited by examiner

AUTOMATIC POINT CLOUD VALIDATION FOR IMMERSIVE MEDIA

CLAIM OF PRIORITY

This Application is a National Stage Entry of, and claims priority to, PCT Application No. PCT/CN2019/086794, filed on 14 May 2019, and titled "AUTOMATIC POINT CLOUD VALIDATION FOR IMMERSIVE MEDIA", which is incorporated by reference in its entirety for all purposes.

BACKGROUND

In some contexts, such as sporting events and other high profile events, a number of high resolution cameras may be installed in a venue and around a performance area or scene. For example, any number of high resolution cameras may be installed in a stadium and trained on a sporting field. Contemporaneous images attained by the cameras are processed using, for example, segmentation and 3D reconstruction, to generate a volumetric model representative of a captured scene, which may be represented as a 3D point cloud. Using the point cloud and a textured surface thereon, immersive views (e.g., with 360 degrees of freedom) from any position within the captured scene (e.g., virtual views) may be generated to provide a viewer with a highly immersive video experience.

The discussed point cloud, due to imperfect segmentation and 3D reconstruction, for example, may miss objects of interest in the scene. Such imperfections in the point cloud may result in mistakes in the resultant immersive views including missing objects or portions of persons and so on, which are undesirable for the viewer. It is with respect to these and other considerations that the present improvements have been needed. Such improvements may become critical as the desire to provide immersive user experiences in scenes, such as professional sporting events, attained by multiple cameras becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
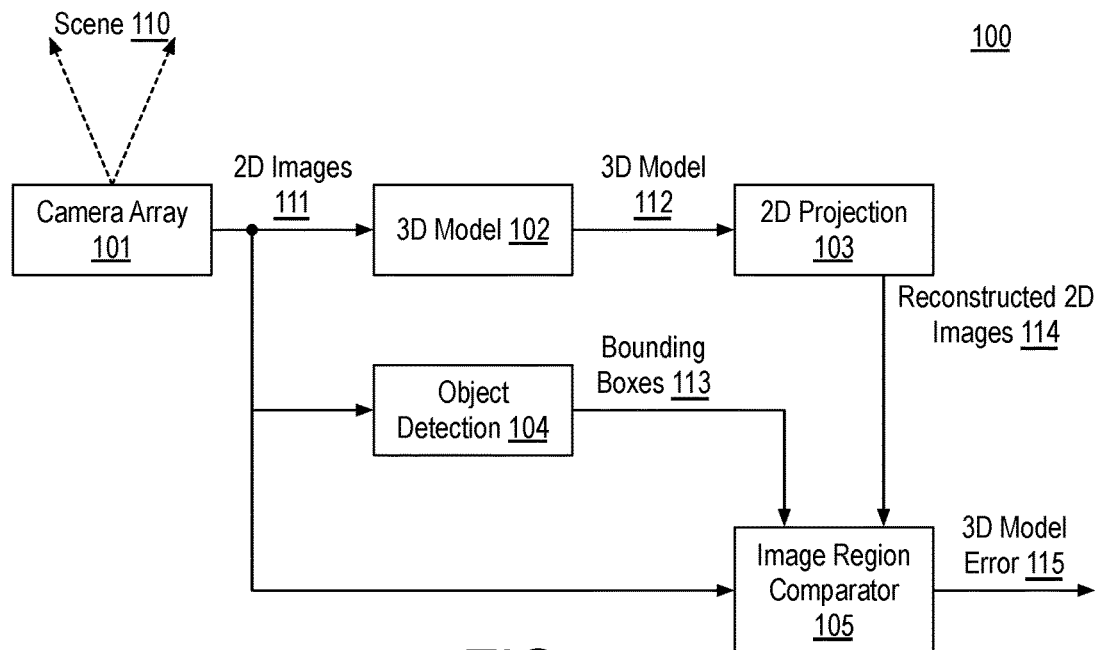
FIG. 1 illustrates an example apparatus for validating a 3D model of a scene.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to automatically validating a 3D model of a scene by comparing object regions of captured images used to generate the 3D model to those regions in reconstructed images from the same viewpoint.

As described above, it may be advantageous to provide users highly immersive video experiences (e.g., with 360 degrees of freedom) with respect to scenes such as high profile sporting events, entertainment events, etc. such that virtual views from within the captured scene are generated. Thereby, previously unattainable views and experiences may be provided for viewers. Such virtual views may be attained by generating a point cloud representative of the scene, applying texture to the point cloud, and determining virtual views using the textured point cloud. Due to imperfect point cloud generation and other reasons, the resultant 3D model may miss objects of interest in the scene, duplicate objects, or include other artifacts and imperfections. In some embodiments, such errors in the 3D model may be detected by performing object detection in one, some, or all captured images used to generate the 3D model. As used herein, a captured image indicates an image as captured by a camera trained on the scene of interest. Such images may be processed using any image processing techniques but retain the scene content as captured by the camera.

For example, the 3D model may be generated using many captured images of a scene (i.e., 36 captured images) using image segmentation and 3D reconstruction to generate a volumetric model of the scene as represented by a 3D point cloud. As used herein, the term volumetric model indicates a model or data structure that represents points or surfaces of objects in a 3D space or volume. The term 3D point cloud indicates a model or data structure that may include points that are determined to be on a surface of an object in the 3D space. For example, each point in the 3D point cloud may include an x, y, and z coordinate indicating the position of the point in space and each point is determined to be on a surface of an object in the space. Of course, some points in the 3D point cloud may be errors and some points may be missing such that an object or portion thereof is not represented by the 3D point cloud although it is part of the scene. As used herein, the term object indicates any discrete material entity that is separate from other objects in the scene. An object may therefore be a person, a sports object such as a ball, or any other discrete entity.

The discussed volumetric model or point cloud may then be textured to generate a 3D model of the scene. As used herein, the term 3D model indicates a volumetric model (such as a 3D point cloud) that includes texture information, which may be provided as red, green, blue channels for points of a 3D point cloud, surface texture that may be applied to a volumetric model or 3D point cloud, or the like. The texture may be applied using any suitable rendering techniques. The 3D model may then be used to generate reconstructed images corresponding to the previously discussed one, some, or all captured images that were used to perform object detection.

Such object detection provides image regions (e.g., bounding boxes) of the captured image(s) within which an object is detected. The image content of the captured image(s) within the image regions is then compared to the image content of the reconstructed image(s) within the (same) image regions. For example, the comparison may generate a difference metric that measures the difference between the corresponding image regions. Such techniques may be performed for a single image region of a pair of corresponding captured and reconstructed images or across several such image pairs in which the detected object is detected. As used herein, the term difference metric indicates any image content comparison measure of difference between the image content such as pixel-by-pixel comparison (e.g., sum of absolute differences (SAD), sum of squares of differences, etc.), shape comparison metrics (e.g., an indicator of whether the same shape is detected within the image regions and/or confidence values indicating the similarity of such detected shapes), person pose comparison metrics (e.g., an indicator of whether the same body pose is detected within the image regions, confidence values indicating the similarity of such detected poses, and indicators of missing body parts between the poses).

The difference metric for a particular image pair or a combination of difference metrics across pairs of images (e.g., a sum of difference metrics, an average of difference metrics, etc.) is compared to a threshold and, if it compares unfavorably to the threshold (e.g., it is greater than the threshold), a 3D model error indicator is generated and reported for the object, time instance of the images, image viewpoints, etc. such that the error may be resolved.

FIG. 1 illustrates an example apparatus 100 for validating a 3D model of a scene, arranged in accordance with at least some implementations of the present disclosure. As shown in FIG. 1, apparatus 100 may include a camera array 101, a 3D model module 102, a 2D projection module 103, an object detection module 104, and an image region comparator 105. Apparatus 100 may be implemented in any suitable form factor device or one or more of such devices including a server computer, a cloud computing environment, personal computer, a laptop computer, a tablet, a phablet, a smart phone, a gaming console, a wearable device, a display device, an all-in-one device, a two-in-one device, or the like. Notably, in some embodiments, camera array 101 may be implemented separately from a device implementing the remaining components of apparatus 100. The images captured via camera 101, 2D images 111, include simultaneously captured images of a scene 110. As used herein, the term simultaneously captured images indicates images that are synchronized to be captured at the same or nearly the same time instance within a tolerance such as 0.1 second. In some embodiments, the captured images are captured as synchronized captured video. For example, the components of apparatus 100 may be incorporated into any multi-camera multi-processor system to deliver immersive visual experiences for viewers of a scene.

As shown, apparatus 100 generates or otherwise attains a 2D images 111. 2D images 111 may include any suitable image data, picture data, video frame data, or the like or any data structure representative of a picture at any suitable resolution. In an embodiment, 2D images 111 includes RGB image data each having R (red), G (green), and B (blue), values for pixels thereof. In an embodiment, 2D images 111 includes YUV image data each having Y (luma), U (chroma 1), and V (chroma 2), values for pixels thereof. However, any suitable color space may be used. In an embodiment, 2D images 111 are pictures of sequences of video pictures captured from different viewpoints. In an embodiment, 2D images 111 have 5 k resolution (e.g., a horizontal resolution of around 5,000 pixels such as 5120×2880 pixel resolution). In some embodiments, 2D images 111 have a resolution of not less than 4 k (e.g., a horizontal resolution of around 4,000 pixels and not less than 3840 pixels such as 3840× 2160 pixel resolution or 4096×2160 pixel resolution).

As discussed, 2D images 111 include any number of simultaneously captured images of scene 110 such that images of scene 110 are captured at the same or approximately the same time instance and such image capture is repeated at a particular frame rate (e.g., 60 fps or 30 fps) over time to provide simultaneously attained video of scene 110. Scene 110 may include any scene such as a sporting event, an entertainment event, a political event, etc. Although typically provided for a high profile event, apparatus 100 may be applied to any scene 110.

Figure 2:
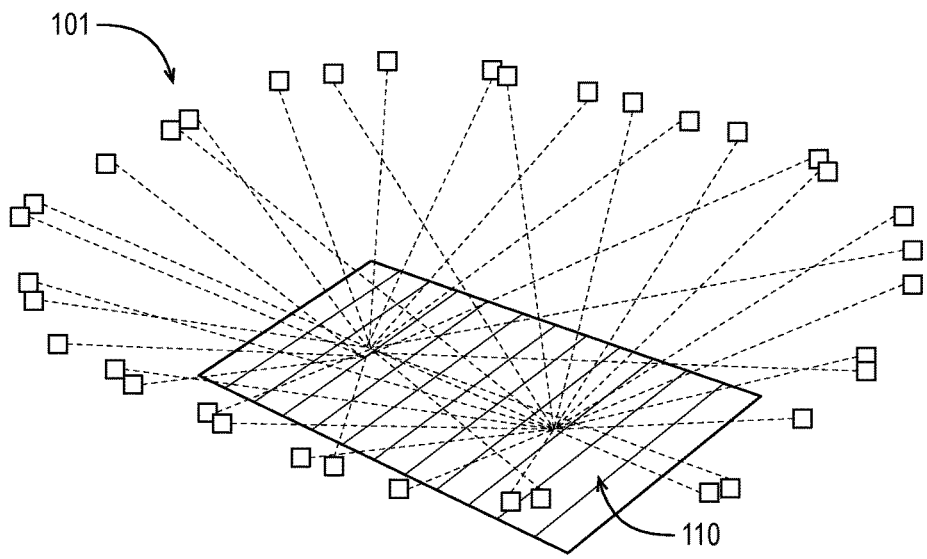
FIG. 2 illustrates an example camera array trained on an example scene.

FIG. 2 illustrates an example camera array 101 trained on an example scene 110, arranged in accordance with at least some implementations of the present disclosure. In the illustrated embodiment, camera array 101 includes 36 cameras trained on a sporting field. However, camera array 101 may include any suitable number of cameras to attain enough images to generate a 3D model of scene 110 such as not less than 20 cameras. Fewer cameras may not provide adequate information to generate the 3D model. Camera array 101 may be mounted to a stadium (not shown) surrounding the sporting field of scene 110, calibrated, and trained on scene 110 to capture simultaneous video. Each camera of camera array 101 has a particular view of scene 110. As used herein, the term view indicates the image content of an image plane of a particular camera of camera array 101 or image content of any view from a virtual camera located within scene 110. Notably, the view may be a captured view (e.g., a view attained using image capture at a camera) or the view may be reconstructed (e.g., a view as projected from a 3D model). As used herein the term reconstructed image indicates image data projected from a 3D model to a particular view. For example, the view may be the same as the view of a particular camera of camera array 101.

Returning now to FIG. 1, 2D images 111 are provided to 3D model module 102, which generates a 3D model 112 for each or many time instances of corresponding 2D images 111. In some embodiments, for each image capture instance, a corresponding 3D model 112 is generated. 3D model module 102 may generate 3D model 112 using any suitable technique or techniques. In some embodiments, 3D model module 102 performs image segmentation and 3D reconstruction using the corresponding images for a particular time instance (e.g., 36 corresponding images captured from camera array 101) from 2D images 111 to generate a point cloud and subsequent rendering of the point cloud to generate 3D model 112 including texture information.

Furthermore, 2D images 111 are provided to object detection module 104, which performs object detection on each of 2D images 111 to detect objects therein. Such object detection may be performed using any suitable technique or techniques to detect objects pertinent to scene 110 such as people, balls or other sports objects, automobiles, and so on. For each detected object of each of 2D images 111, a bounding box of bounding boxes 113 indicative of the image region including the detected object is generated. Bounding boxes 113 may include any suitable data structure indicating such image regions such as top left coordinates and dimensions of the corresponding image regions. Notably, since the same object may be detected from more than one of 2D images 111 (e.g., the same object will recur in some or even all views of camera array 101), the locations of bounding boxes 113 may be augmented in terms of accuracy by applying multi-view geometric constraints that constrain the location of a bounding box for an object in a particular image based on the location of bounding boxes in other images for the object.

Returning to discussion of 3D model 112, as shown, 2D projection module 103 receives 3D model 112 and 2D projection module 103 generates reconstructed 2D images 114 such that reconstructed 2D images 114 include a 2D reconstructed image for each view of camera array 101. Such reconstructed 2D images 114 may be generated using any suitable technique or techniques that project 3D model 112 to an image plane corresponding to a particular view of a camera of camera array 101.

Image region comparator 105 receives 2D images 111, bounding boxes 113, and reconstructed 2D images 114. For each, some, or all detected objects of 2D images 111, image region comparator 105 compares image regions of 2D images 111 and reconstructed 2D images 114 within the same bounding box. That is, for a particular object and camera view including the object, the image region of the captured 2D image including the object and the image region of the 2D reconstructed image that is expected to include the object are compared. Such comparisons may also be made for every other captured 2D image/2D reconstructed image pair having the object detected in the captured 2D image. The comparison may be performed using any suitable technique or techniques and a difference metric for the comparison may be generated. The difference metric is a measure of image region difference and may include pixel-by-pixel comparison (e.g., SAD), object shape comparison, person pose comparison, etc. Such difference metric generation may include any sub-processing necessary for the comparison such as pose detection in the image regions, object detection in the image regions, edge detection in the image regions, and so on.

As discussed, in some embodiments, the difference metric may be determined using several image pairs for a particular object. In such embodiments, the difference metrics may be combined (e.g., added, averaged, etc.). In other embodiments, a difference metric may be generated for a particular object using only one image pair of 2D captured and 2D reconstructed images. In any event, the overall difference metric is compared to a threshold and, if it compares unfavorably to the threshold, a 3D model error 105 is reported. 3D model error 105 may include any indicator(s) or data structures indicative of the detected error such as the detected object corresponding to the error, a location of the detected object corresponding to the error, a time stamp indicating the time instance of the error, camera view(s) corresponding to the error, etc.

As discussed, if a difference metric compares unfavorably to a threshold, 3D model error 105 is reported. As used herein, compares unfavorably with respect to a threshold indicates the parameter does not meet the expectation set by the threshold. For example, for a difference metric, the difference metric compares unfavorably to the threshold when it exceeds the threshold (or meets or exceeds the threshold). Furthermore, in some embodiments, the threshold may be zero such as when the difference metric includes an indicator of a matching shape of an object (e.g., a value of 1 may indicate a shape mismatch), when the difference metric includes an indicator of a number of body parts mismatched between poses (e.g., a value of 1 or more may indicate pose mismatch), etc. Furthermore, in some embodiments, the threshold may scale with the size of the bounding box including the detected object. For example, for pixel-by-pixel comparison thresholds, a threshold may be determined based on a minimum bounding box size (e.g., based on a 32×32 or 64×64 pixel minimum bounding box) and the threshold may be scaled (e.g., linearly) to the size of the actual bounding box(es) being implemented. Alternatively, the difference metric may be normalized based on the minimum bounding box size.

Figure 3:
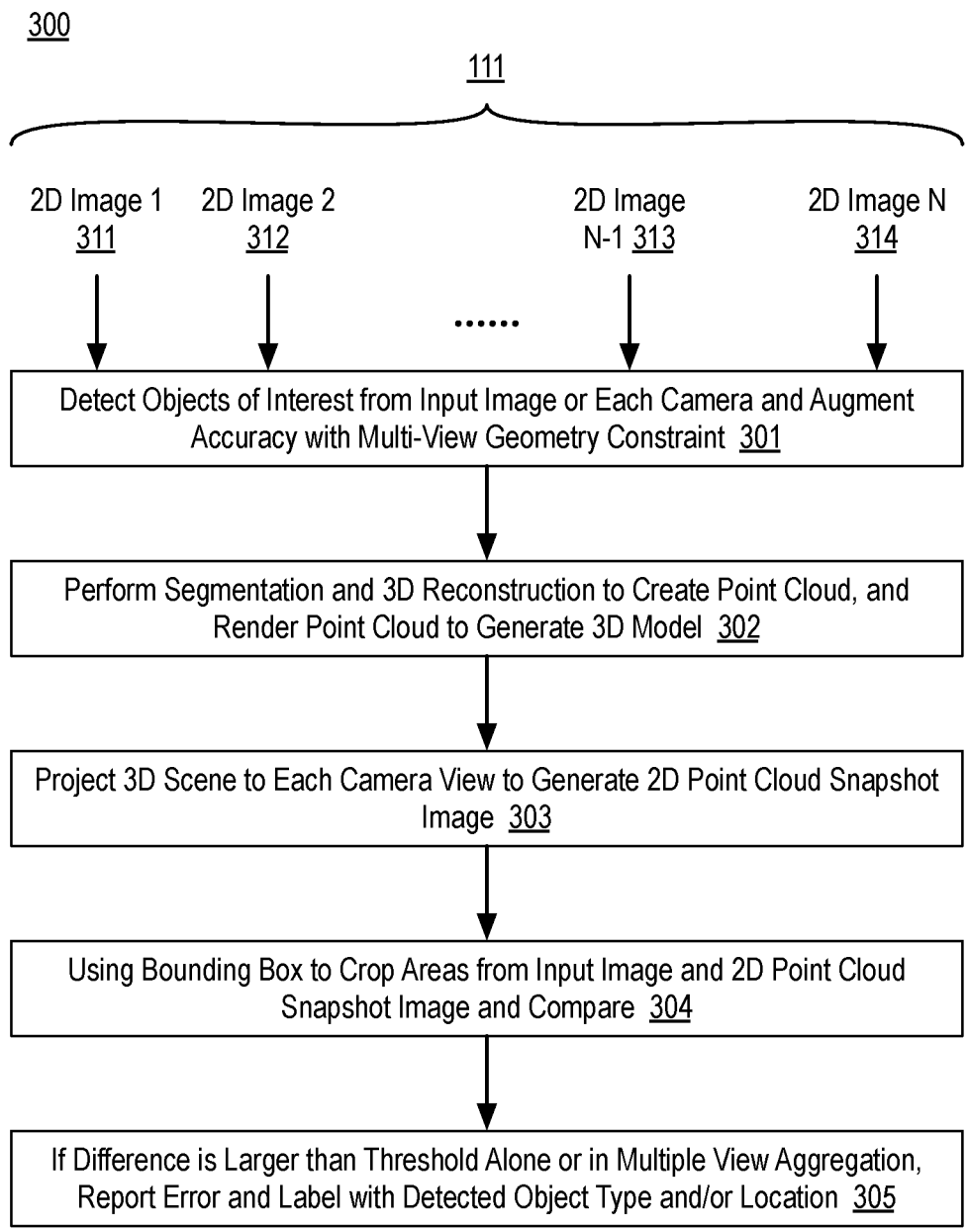
FIG. 3 illustrates an example process for validating a 3D model of a scene.

FIG. 3 illustrates an example process 300 for validating a 3D model of a scene, arranged in accordance with at least some implementations of the present disclosure. Process 300 may include one or more operations 301-305 as illustrated in FIG. 3. For example, operation 301 may be performed by object detection module 104, operation 302 may be performed by 3D model module 102, operation 303 may be performed by 2D projection module 103 and operations 304 and operation 305 may be performed by image region comparator 105. As shown, 2D images 111 from camera array 101 are provided as input to process 300 such that 2D images 111 include N images each having a different view of scene 110 such as 2D image 1 311, 2D image 2 312, 2D image N−1 313, and 2D image N 314. Process 300 applies object detection (e.g., ball, player, human joint, etc.) on captured input images 2D images 111 with the object detection location accuracy optionally augmented via multi-view geometric constraints. The resultant highly accurate bounding box (e.g., one camera view has one bounding box) for each object (optionally including only important objects such as the ball in a sporting scene), a 3D model is projected to each camera view. The detected bounding box is then used to crop an image region (e.g., a rectangular image region) and the image region of the captured image is compared to the image region of the reconstructed image (for the same camera view) over the bounding box area. The comparison may be applied to all camera views and, in response to any detected image region differences comparing unfavorably to a threshold, an inference is made that object of interest has poor quality in the 3D model, which is reported as 3D model error 115. For example, the 3D model error may have an underlying error in the 3D point cloud used to generate the 3D model (e.g., a missing object in the 3D point cloud). Any suitable response may be made in accordance with the reported error such as inserting the object into the 3D model (using a prior modeling of the object, pre-knowledge of the object, etc.), not allowing image view features for the image region (e.g., zooming or rotation), and so on.

Process 300 begins at operation 301, where 2D images 111 are received for processing and objects of interest are detected within 2D images 211 using the input image of each camera view. As shown, the resultant detection may optionally be augmented for accuracy using multi-view geometry constraints. For example, when an object is detected more than one of 2D images 111, locations of the detected objects may be constrained based on the relationships between the views of the 2D images. Such geometry constraints may be used to improve the accuracy of the locations of objects within 2D images. As discussed, only objects of interest may be detected at operation 301. For example, for a scene including a sporting event, objects of interest may include a ball and persons (e.g., players and referees). Such limitation of object detection to only pertinent objects of interest may eliminate false positive detections in 2D images 111.

As discussed, operation 301 includes object detection from input 2D images 111 corresponding to each camera view of camera array 101 such that camera array 101 has multiple cameras installed around a scene (e.g., in stadium) such that each camera of camera array 101 is trained on (e.g., points to) a particular area of the scene with each camera outputting, for example, 5K resolution images at a speed of 30 fps. The object detection performed at operation 301 may include any suitable object detection techniques such as deep learning based object detection (e.g., you only look once (YOLO) object detection, single shot multi-box object detection (SSD), etc.) on each captured image of 2D images 111 to attain bounding box(es) corresponding to each detected object (e.g., for the ball and each player). In some embodiments, skeleton detection techniques may be used to detect persons and locate human joints. Furthermore, the object detection performed at operation 301 may be enhanced by object tracking across time instances of simultaneous images.

Since the cameras of camera array 101 are well synchronized, geometric constraints can be applied to bounding box instances across views for the same detected object for improved bounding box location accuracy and/or object detection in one of 2D images 111 may be used to enhance object detection in another of 2D images 111. In some embodiments, to enhance object detection accuracy and to leverage the advantage of multiple calibrated cameras in camera array 101, a multiple view geometry constraint is enforced such that the 3D object location (e.g., forward projection) is determined per 2D bounding box and camera projection matrix and then the 3D location of the detected object is projected back to each camera view to determine a new 2D location of the object (e.g., backward projection). Then, a local search for the object may be performed to fix any incorrect object detection in terms of the object detected and/or the location of the detected object.

Figure 4:
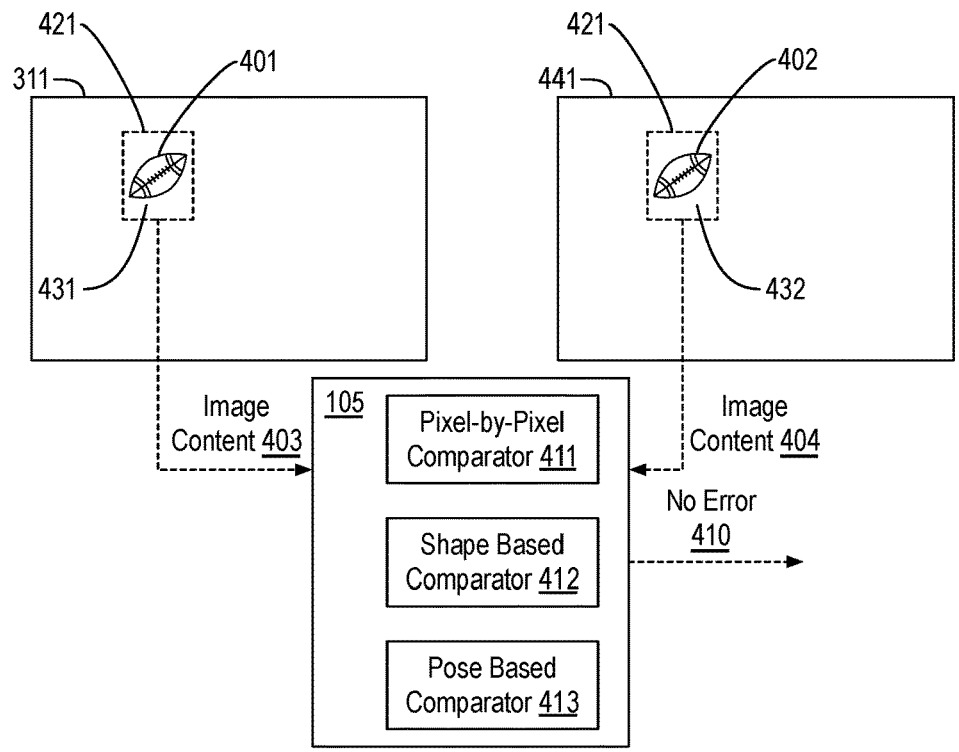
FIG. 4 illustrates an example comparison of image regions within a captured image and a reconstructed image.

FIG. 4 illustrates an example comparison of image regions within a captured image and a reconstructed image, arranged in accordance with at least some implementations of the present disclosure. As shown in FIG. 4, for one of 2D images 111, such as an example captured 2D image 311, an object of interest 401 (e.g., a ball or other sporting item) is detected as discussed with respect to operation 301 and an image region 431 is defined within bounding box 421 corresponding to object of interest 401. As discussed, bounding box 421 may be defined using a top left coordinate of bounding box 421 and horizontal and vertical dimensions. Furthermore, the location and/or size of bounding box 421 may be refined using geometric constraints as provided by object of interest 401 being detected in other captured 2D images 111 (not shown).

Returning to FIG. 3, processing continues at operation 302, where, using 2D images 111, image segmentation, 3D reconstruction, and rendering are performed to create a 3D model. Such techniques may include point cloud reconstruction by binarization of 2D images 111, background modeling, foreground detection, image segmentation of 2D images 111, and 3D reconstruction to generate a 3D point cloud having, as discussed herein, 3D coordinates for each point such that each point is deemed to be located at a surface of an object in a scene. The 3D point cloud or similar data structure is then rendered or painted to create a 3D model having surfaces with texture.

Processing continues at operation 303, where the 3D model is projected to each camera view corresponding to the views of 2D images 111 (i.e., to a view of each of 2D image 311, 2D image 312, 2D image 313, 2D image 314, and so on). Such 3D model projection may be performed using any suitable technique or techniques to provide 3D scene projection to each camera view. In some embodiments, for each camera of camera array 101, a camera projection matrix is generated. For example, since each camera of camera array 101 is calibrated before scene capture and the calibration continues during scene capture to mitigate, for example, the impact of wind or other camera disturbances, high quality camera projection matrices are maintained and/or generated before and during scene capture. Using the camera projection matrices and the 3D model discussed with respect to operation 302, a backward projection may be employed to map the 3D model of the 3D scene to each camera view corresponding to the views of 2D images 111 to generate reconstructed 2D images 114 such that each of captured 2D images 111 has a corresponding reconstructed 2D image 114 that has the same view. Such reconstructed 2D images 114 may be characterized as 3D model snapshot images, point cloud snapshot images with texture, virtual view images, or the like. In some embodiments, the 3D model (and corresponding point cloud) uses the same coordinate system as camera array 101 such that reconstructed 2D image 114 has the same coordinate system its corresponding one of 2D images 111.

Processing continues at operation 304, where, using the bounding box(es) generated at operation 301 (i.e., bounding boxes 113), an image region of the captured 2D image of captured 2D images 111 and a corresponding image region of the reconstructed 2D image of reconstructed 2D images 114 are compared. That is, corresponding image regions, one each from the captured 2D image and the reconstructed 2D image, are compared. The image regions, using the bounding box for cropping, have the same coordinates and dimensions within the captured 2D image and the reconstructed 2D image.

With reference to FIG. 4, a reconstructed 2D image 441 (i.e., the reconstructed 2D image of reconstructed 2D images 114 that has the same view as captured 2D image 311) is generated as discussed with respect to operation 303. As shown, an image region 432 is defined within bounding box 421 (note: the same bounding box is applied to both reconstructed 2D image 441 and captured 2D image 311). In the example of FIG. 4, image region 432 of reconstructed 2D image 441 includes an object 402 that matches object of interest 401.

Operation 304 of process 300 may compare image regions 431, 432 using any suitable technique or techniques. In some embodiments, object comparison and error identification include, after determining bounding box 421 for object of interest 401 as detected in captured 2D image 311, using bounding box 421 to crop image region 431 from captured 2D image 311 and image region 432 from reconstructed 2D image 441 for comparison. Notably, in theory, if 3D model 112 performs perfect segmentation, 3D reconstruction, and rendering (e.g., painting), then the object will be identical between captured 2D image 311 and reconstructed 2D image 441. For comparison, image regions 431, 432 are compared and a measure of error or difference metric is used. If the difference metric compares unfavorably to a threshold, an error is reported. If not, no error is reported. In some embodiments, a difference metric based only on image regions 431, 432 is compared to a threshold. In other embodiments, the difference metric based on image regions 431, 432 is combined with other difference metrics for object of interest 401 (e.g., across all of captured 2D images 111 where object of interest 401 is detected) and the combined metric is compared to a threshold. In either event, the 3D model error indicator is generated in response to the difference metric based on image regions 431, 432 comparing unfavorably to a threshold.

The difference metric based on image regions 431, 432 may be any suitable difference metric or a combination thereof. As shown in FIG. 4, image region comparator 105 receives image content 403 (corresponding to image region 431) and image content 404 (corresponding to image region 432) and image region comparator 105 may include one or more of a pixel-by-pixel comparator 411, a shape based comparator 412, and a pose based comparator 413. Image content 403, 404 may include any suitable image content pertinent to the comparison being performed for image regions 431, 432 such as pixel data (e.g., pixel values in any color space or for only a luma channel), object of interest type (if available), skeleton or pose data (if available), and so on. With reference to FIG. 3, process 300 continues at operation 305, where, in response to the difference metric comparing unfavorably to a threshold either alone or in multiple view aggregation, an error is reported and labeled with, for example, the object type of the object of interest, location of the detected object of interest, a time stamp, etc.

Returning to FIG. 4, In some embodiments, pixel-by-pixel comparator 411 may compare image regions 431, 432 in a pixel-by-pixel manner by using SAD, sum of squares of differences, etc. For example, differences in corresponding pixel values between image regions 431, 432 may be used based on RGB values, YUV values, only Y values, etc. to determine a pixel-by-pixel difference metric between image regions 431, 432. As discussed, the difference metric may be normalized based on the size of bounding box 421 and compared to a threshold to determine whether an error exists for object of interest. In the example of FIG. 4, no error may be detected as shown with respect to no error signal 410, which may be provided or presumed in the absence of an error signal. For embodiments using a combined metric as discussed herein, the normalized error metrics for any image pairs having object of interest 401 may be averaged and compared to a threshold.

In some embodiments, shape based comparator 412 may be used to compare image regions 431, 432. For example, a shape detector may be applied to one or both of image regions 431, 432 to detect one or more shapes therein. The detected shape(s), if any, may then be compared to generate a difference metric. For example, for each shape detected in one of image regions 431, 432 but not the other, a count of one may be applied for the difference metric. The shape based difference metric may then be compared to a threshold to determine whether an error exists for object of interest. In some embodiments, the threshold may be zero as matched shape based comparison is expected. In the example of FIG. 4, no error may be detected as shown with respect to no error signal 410, which may be provided or presumed in the absence of an error signal. For embodiments using a combined metric as discussed herein, the shape based difference metrics for any image pairs having object of interest 401 may be summed and compared to a threshold.

In some embodiments, pose based comparator 413 may be used to compare image regions 431, 432. For example, a pose detector may be applied to one or both of image regions 431, 432 to detect one or more human poses therein. Alternatively or in addition, such pose detection may have been used to detect object of interest 401 (e.g., where object of interest 401 is a person). The detected pose(s), if any, may then be compared to generate a difference metric. For example, for each part of a pose detected in image regions 431, 432 but not the other, a count of one may be applied for the difference metric. For example, image region 431 may include a pose having a head, two arms, and two legs, while image region 432 may include a pose having a head, two arms, and one leg, indicating a missing leg, which may add to the pose difference metric. The pose based difference metric may then be compared to a threshold to determine whether an error exists for object of interest. In some embodiments, the threshold may be zero as matched shape based comparison is expected. For embodiments using a combined metric as discussed herein, the pose based difference metrics for any image pairs having object of interest 401 may be summed and compared to a threshold. In other embodiments, the absolute values or squares of differences between the locations of joints and body elements between the poses may be determined and compared to a threshold.

Figure 6:
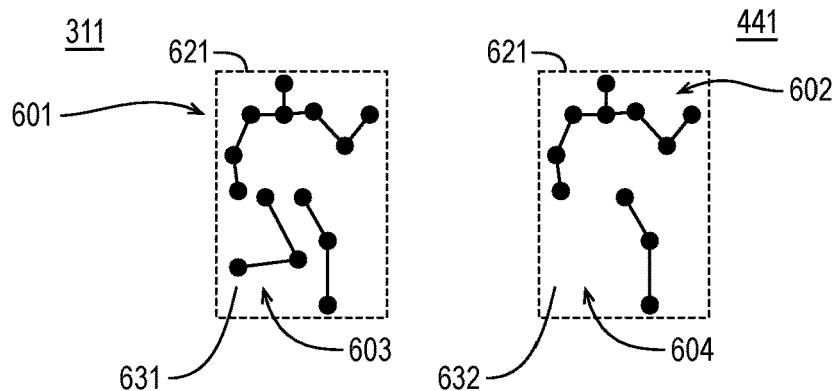
FIG. 6 illustrates an example comparison of image regions having detected human poses.

FIG. 6 illustrates an example comparison of image regions having detected human poses, arranged in accordance with at least some implementations of the present disclosure. As shown in FIG. 6, an image region 631 within a bounding box 621 of captured 2D image 311 may include a detected pose 601 having joints (as indicated by dots) connected by segments or bones (as indicated by lines connecting particular dots). Similarly, an image region 632 within bounding box 621 of reconstructed 2D image 441 may include a detected pose 602 having joints connected by segments or bones. As shown, detected pose 601 may include a head, two shoulders, a sternum, two elbows, two hands, two hips, two knees, and two feet while detected pose 602 includes a head, two shoulders, a sternum, two elbows, two hands, one hip, one knee, and one foot. Notably, leg 603 is missing in detected pose 602 as indicated by empty region 604. In some embodiments, pose based comparator 413 may list all elements of detected pose 601 and detected pose 602 and add one to a difference metric for each missing element between detected poses 601, 602. As discussed, when the difference metric exceeds a threshold either in a single image pair or across aggregation of several image pairs, an error indicator is provided. For example, pose based comparator 411 provides a human pose comparison of human poses such as pose 601 and pose 602 to generate a difference metric based on, for example, one or missing limbs, joints, elements, etc.

In some embodiments, a pose difference metric is generated based on, for example, absolute values or squares of the positions of joints of between poses 601, 602. The pose difference metric may then be compared to a threshold. In some embodiments, the threshold is provided for a particular pose size and scaled based on the size of one or both of poses 601, 602. As with other techniques discussed herein, the pose difference metric may be determined between only poses 601, 602 or it may be aggregated across all pairs of poses available for the person corresponding to poses 601, 602.

Returning to FIG. 4, as discussed, one or more of pixel-by-pixel comparator 411, shape based comparator 412, and pose based comparator 413 may be employed. In some embodiments, one or more of pixel-by-pixel comparator 411, shape based comparator 412, and pose based comparator 413 may be employed based on an object type of object of interest 401. For example, for a ball or other sporting item, pixel-by-pixel comparator 411 and shape based comparator 412 may be employed. In another example, for a person, pixel-by-pixel comparator 411 and pose based comparator 413 may be employed. In some embodiments, to pass error detection, each of the selected comparators (if more than one) may need to pass for no error to be detected.

Figure 5:
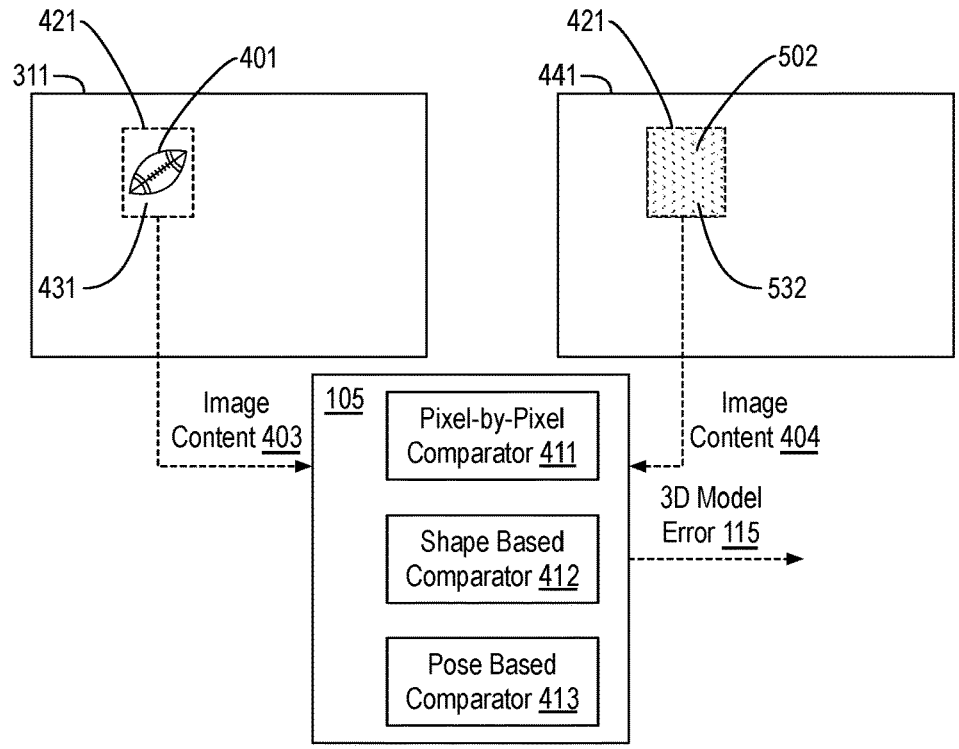
FIG. 5 illustrates another example comparison of image regions within a captured image and a reconstructed image.

FIG. 5 illustrates another example comparison of image regions within a captured image and a reconstructed image, arranged in accordance with at least some implementations of the present disclosure. FIG. 5 is similar to FIG. 4 with the exception that image region 532 having no object 502 does not match image region 431 and, in response thereto, 3D model error 115 is issued by image region comparator 105. As discussed, image region comparator 105 may implement one or more of pixel-by-pixel comparator 411, shape based comparator 412, and pose based comparator 413. In the example of FIG. 5, based on object of interest 401 being a ball, image region comparator 105 may implement one or both of pixel-by-pixel comparator 411 and shape based comparator 412. When both are implemented, 3D model error 115 may be issued when either pixel-by-pixel comparator 411 or shape based comparator 412 indicates an error (e.g., a difference greater than a threshold). Thereby, more robust error detection may be provided.

Returning to FIG. 3, process 300 may be performed at any time instance of image or video frame capture to provide continuous automatic validation of the 3D model. Such techniques offer low computational complexity and no human intervention 3D model (and point cloud) validation. Errors in the 3D model (and point cloud) may occur, for example, due to imperfect segmentation and 3D reconstruction that causes missed objects of interest such as a ball, a body part of a person player (e.g., leg, arm, etc.), etc. in a scene.

As discussed with respect to operation 305, when a single or aggregated difference metric compares unfavorably to a threshold, an error indicator is provided indicative of the underlying 3D model corresponding to a 2D reconstructed image having an error such as a missing object. As discussed, in some embodiments, the threshold may be normalized to a bounding box size, in particular in cases of pixel-by-pixel evaluation. In other embodiments, the threshold or normalized threshold may be varied based on the location of a bounding box within an image and/or based on a bounding box density near the bounding box of interest.

Figure 7:
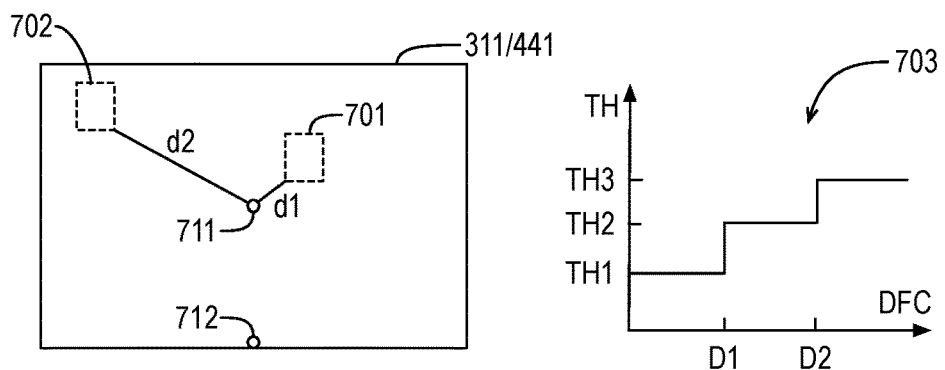
FIG. 7 illustrates an example threshold variation based on the location of a bounding box within an image.

FIG. 7 illustrates an example threshold variation based on the location of a bounding box within an image, arranged in accordance with at least some implementations of the present disclosure. As shown in FIG. 7, image regions are defined within bounding boxes 701, 702. Although discussed with respect to bounding boxes for the sake of clarity, the discussion of FIG. 7 applies equally to image regions within such bounding boxes. For example, bounding box 701 may correspond to a certain object and bounding box 702 to a different object within the same frame. In addition or in the alternative, bounding boxes 701, 702 may indicate different examples of bounding boxes for a particular object of interest within separate instances of captured 2D image 311. Notably, comparison of image regions within such bounding boxes may be performed as discussed elsewhere herein.

In the embodiment of FIG. 7, different thresholds are applied to bounding boxes 701, 702 in response to the proximity of bounding boxes 701, 702 to a center 711 of captured 2D image 311 (and the same center of corresponding reconstructed 2D image 441). For example, due to more important image content tending to be toward center 711 of captured 2D image 311, a lower threshold may be applied for image content comparison for bounding box 701 relative to that of bounding box 702 based on the distance from center 711 to bounding box 701, d1, being less than the distance from center 711 to bounding box 702, d2. That is, lower difference thresholds may be applied for central portions of 2D images 311, 441 such that the central portions provide errors more sensitive to minor discrepancies while edge portions of 2D images 311, 441 do not provide errors as sensitively. The distances to bounding boxes, 701, 702 may be determined using any suitable technique or techniques such as a distance to center of bounding boxes 701, 702, distance to closest corner of bounding boxes 701, 702 (as shown), etc.

Furthermore, the applied threshold based on distance from center of image to bounding boxes 701, 702 may be determined using any suitable technique or techniques such as application of a function to the distance (e.g., via calculation or look up table). In an embodiment, the threshold is a monotonic increasing function of the distance from center of the image, DFC. For example, the threshold may be determined by applying a monotonically increasing linear function to the DFC, applying a monotonically increasing step function to the DFC, or applying any other suitable monotonic increasing function to the DFC. FIG. 7 illustrates an example function 703 for determining the applied threshold in response to a distance of a bounding box from the image center. In the illustrated example, function 703 is a step function that steps from a low threshold, TH1, for any distance less than or equal to distance D1, to a medium threshold, TH2, for any distance between distance D1 and D2 (which is greater than D1), to a high threshold, TH3, for any distance greater than distance D2. Such distances may be determined in pixels for example and may include any suitable pixel distances.

Although discussed with respect to a distance from center 711 of 2D images 311, 441, in some embodiments, the bounding box distance may be measured from a bottom center 712 of 2D images 311, 441 as, notably, more detail of an image may be found at the bottom of 2D images 311, 441 particularly when the image is of a sports scene on a large flat field with a high camera angle. In such contexts, image objects appear larger near bottom center 712 of 2D images 311, 441, the camera tends to focus on such image objects, and errors therein may be more distracting. Furthermore, in other contexts, the discussed distance measure may be from another point of interest of 2D images 311, 441.

In the example of pixel-by-pixel comparison, the threshold may be a scalable threshold such that each of the available thresholds (e.g., TH1, TH2, TH3) is for a minimum bounding box size and the threshold may then be scaled to the appropriate bounding box size. As discussed, the thresholds may be monotonically increasing for center to bounding box distances such that bounding boxes within center portions of 2D images 311, 441 use a smaller difference threshold (and therefore provide more errors for the same image region discrepancies) while edge portions of 2D images 311, 441 use a larger difference threshold (and therefore provide fewer errors for the same image region discrepancies).

For the example of human pose comparison where missing elements between poses are used, the threshold may vary from a threshold of zero at TH1 to a second threshold that allows one or two (e.g., TH2=1 or 2), for example, joints or human pose elements to be missing and, optionally to a third threshold that allows, two to four (e.g., TH3=2 to 4), joints or human pose elements to be missing. Notably, the threshold may not extend to a person or player being entirely missing but may allow a few missing body parts or elements of edge portions of 2D images 311, 441. In some embodiments, a particular missing body part (such as a head) may trigger an error regardless of any applied thresholding. In other human pose comparison embodiments, such as where a measure of pose position difference is used, the threshold may be scalable and the thresholds, as with the pixel-by-pixel threshold, may be monotonically increasing for center to bounding box (or center to pose) distances such that poses within center portions of 2D images 311, 441 use a smaller difference threshold (and therefore provide more errors for the same pose discrepancies) while edge portions of 2D images 311, 441 use a larger difference threshold (and therefore provide fewer errors for the same pose discrepancies).

In the shape based comparison, the threshold may again vary from a low threshold to high thresholds with an optional medium threshold therebetween. In some embodiments, a characteristic or measure of a shape may be compared such as a ratio of a size of the shape between the captured and reconstructed image, and varying thresholding may be applied. In some embodiments, shape based comparison may simply use a single threshold to indicate whether a match occurs or not and varying thresholds may not be employed.

Figure 8:
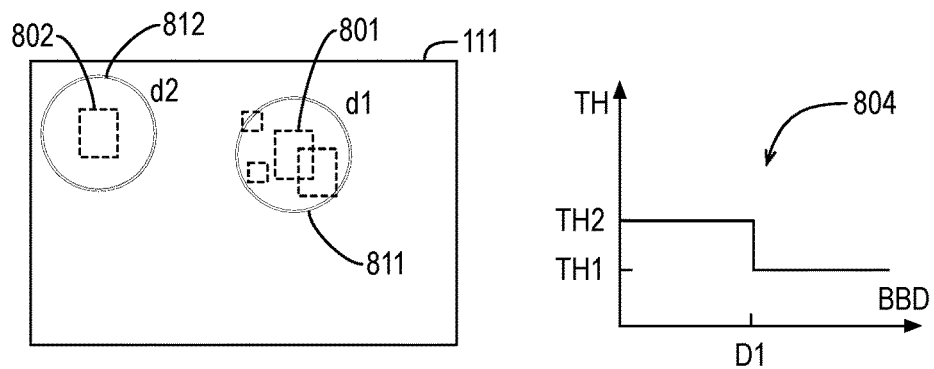
FIG. 8 illustrates an example threshold variation based on bounding box density.

FIG. 8 illustrates an example threshold variation based on bounding box density, arranged in accordance with at least some implementations of the present disclosure. As shown in FIG. 8, image regions are defined within bounding boxes 801, 802 as discussed with respect to FIG. 7. Although discussed with respect to bounding boxes for the sake of clarity, the discussion of FIG. 8 applies equally to image regions within such bounding boxes. For example, bounding box 801 may correspond to a certain object and bounding box 802 to a different object within the same frame. In addition or in the alternative, bounding boxes 801, 802 may indicate difference examples of bounding boxes for a particular object of interest within separate instances of captured 2D image 311. Comparison of image regions within such bounding boxes may be performed as discussed elsewhere herein.

In the embodiment of FIG. 8, different thresholds are applied to bounding boxes 801, 802 in response to a bounding box density around bounding boxes 701, 702. For example, due to more important image content tending to be gathered together, a lower threshold may be applied for image content comparison for bounding box 801 relative to that of bounding box 802 based on bounding box 801 being in a high bounding box density region, as indicted by density d1, and bounding box 801 being in a low density region, as indicted by density d2. That is, lower difference thresholds may be applied for bounding boxes in a high density bounding box region of 2D images 311, 441 while a higher threshold is applied for bounding boxes in a low density bounding box region of 2D images 311, 441. The bounding box densities of bounding boxes, 701, 702 may be determined using any suitable technique or techniques such as determining regions 811, 812 around bounding boxes 801, 802, respectively, and counting the number of bounding boxes within regions 811, 812. In the illustrated embodiment, bounding box 802 is in a low density region 802 having one bounding box in region 812 while bounding box 801 is in a high density region 801 having, in this case, four bounding boxes in region 811.

Furthermore, the applied threshold based on bounding box density (or number of bounding boxes within a region) may be determined using any suitable technique or techniques such as application of a function to the density (e.g., via calculation or look up table). In an embodiment, the threshold is a monotonic decreasing function of the bounding box density, BBD. For example, the threshold may be determined by applying a monotonic decreasing linear function to the BBD, applying a monotonic decreasing step function to the BBD, or applying any other suitable monotonic decreasing function to the BBD. In an embodiment, function 804 is applied to determine the applied threshold in response to a bounding box density or count. In the illustrated example, function 804 is a step function that steps from a high threshold, TH1, for any density less than or equal to density D1, to a low threshold, TH2, for any density greater than density D1. In an embodiment, the density D1 is one. In some embodiments, the density D1 is two.

As with the previous discussion, for pixel-by-pixel comparison, the threshold may be a scalable threshold such that each of the available thresholds (e.g., TH1, TH2) is for a minimum bounding box size and the threshold may then be scaled to the appropriate bounding box size. In some embodiments, the thresholds may be monotonically decreasing based on bounding box density such that bounding boxes in higher density regions use a smaller difference threshold (and therefore provide more errors for the same image region discrepancies) while lower density regions use a larger difference threshold (and therefore provide fewer errors for the same image region discrepancies).

For the example of human pose comparison where missing elements between poses are used, the threshold may vary from a threshold of zero at TH1 to a second threshold that allows one or two (e.g., TH2=1 or 2), for example, joints or human pose elements to be missing. The threshold may again not extend to a person or player being entirely missing but may allow a few missing body parts or elements at low bounding box densities or sole bounding boxes within a particular region. As with distance from center examples, a particular missing body part (such as a head) may trigger an error regardless of any applied thresholding. In human pose comparison embodiments where a measure of pose position difference is used, the threshold may be scalable and the thresholds, as with the pixel-by-pixel threshold, may be monotonically decreasing based on bounding box or pose density.

In the shape based comparison, the threshold may again vary from a low threshold to high threshold. In some embodiments, a characteristic or measure of a shape may be compared such as a ratio of a size of the shape between the captured and reconstructed image, and varying thresholding may be applied. In some embodiments, shape based comparison may use a single threshold to indicate whether a match occurs.

In the examples of FIGS. 7 and 8, single image pair comparisons may be made or aggregation of image pair comparisons may be applied. For example, the discussed threshold varying may be applied to average distance from centers across all image pairs including a particular object of interest, average bounding box densities across all image pairs including a particular object of interest, etc.

As discussed herein, image regions of a captured image (e.g., those that correspond to detected objects of interest) are compared to the same image regions of a reconstructed image to automatically and efficiently detect errors in the underlying 3D model used to generate the reconstructed image.

Figure 9:
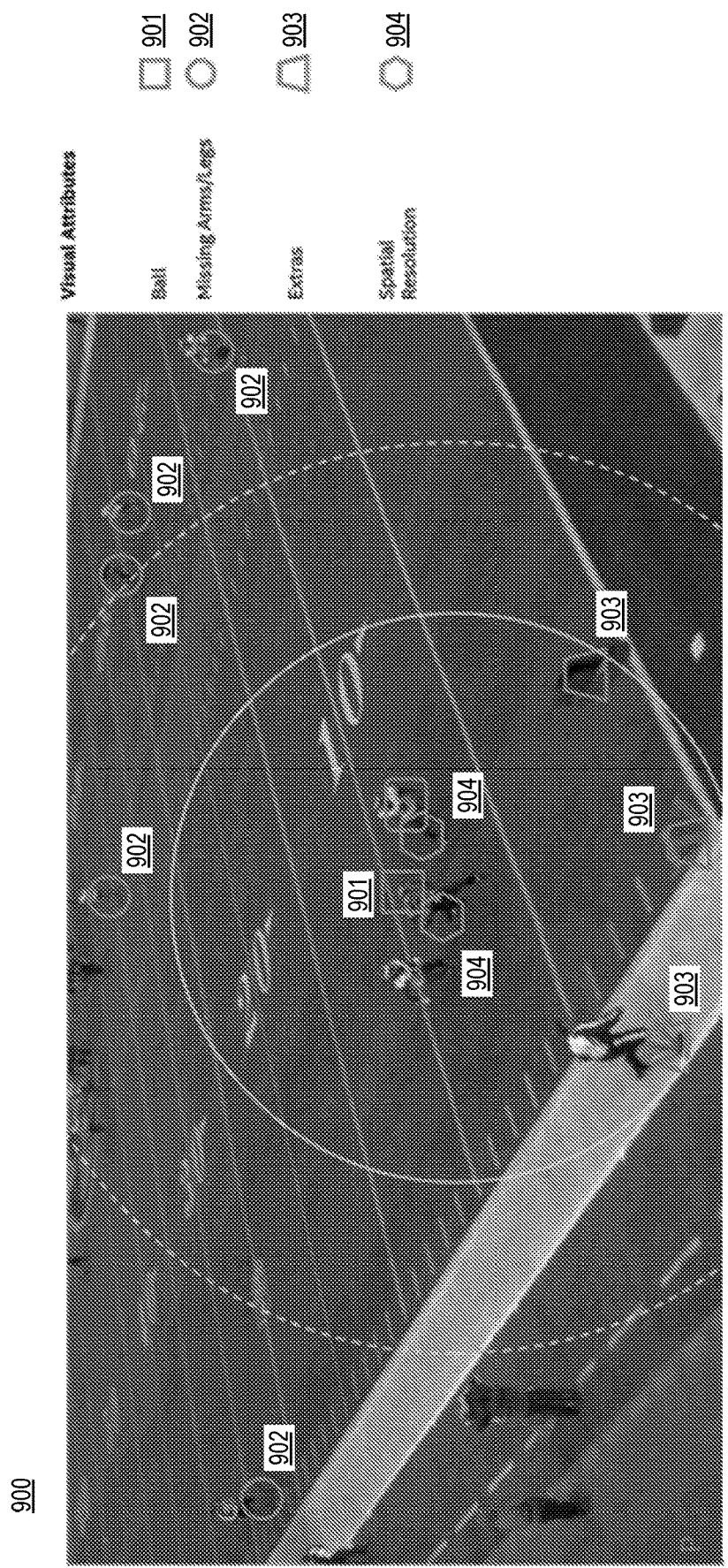
FIG. 9 illustrates an example reconstructed 2D image.

FIG. 9 illustrates an example reconstructed 2D image 900, arranged in accordance with at least some implementations of the present disclosure. As shown in FIG. 9, reconstructed 2D image 900 may be reconstructed to have the same view as a camera used to attain an image of a scene. In the context of FIG. 9, reconstructed 2D image 900 corresponds to a corner end zone view of a football game.

As shown with respect to reconstructed 2D image 900, reconstructed 2D images of a sporting event may include a ball 901 (or other sporting item), a variety of persons, and a background such as a field. Notably, the underlying 3D model used to project reconstructed 2D image 900 to the camera view has correctly modeled much of the scene. However, reconstructed 2D image 900 includes error such as missing limbs 902, extra items 903, and spatial resolution problems 904. Notably, the errors of reconstructed 2D image 900 may be detected and reported using the techniques discussed herein. Furthermore, reconstructed 2D image 900 illustrates the importance of errors near a center of reconstructed 2D image 900 or near a center bottom of reconstructed 2D image 900 as persons there tend to appear larger, the action is focused there, etc. as well as the importance of errors of high bounding box density where, again action tends to be focused. Errors in such regions may be captured with lower error thresholds as they tend to be more distracting and tend to be in regions a user may desire to zoom in on, rotate around, etc.

As discussed with respect to operation 301, object tracking may be used to supplement object detection operations.

Figure 10:
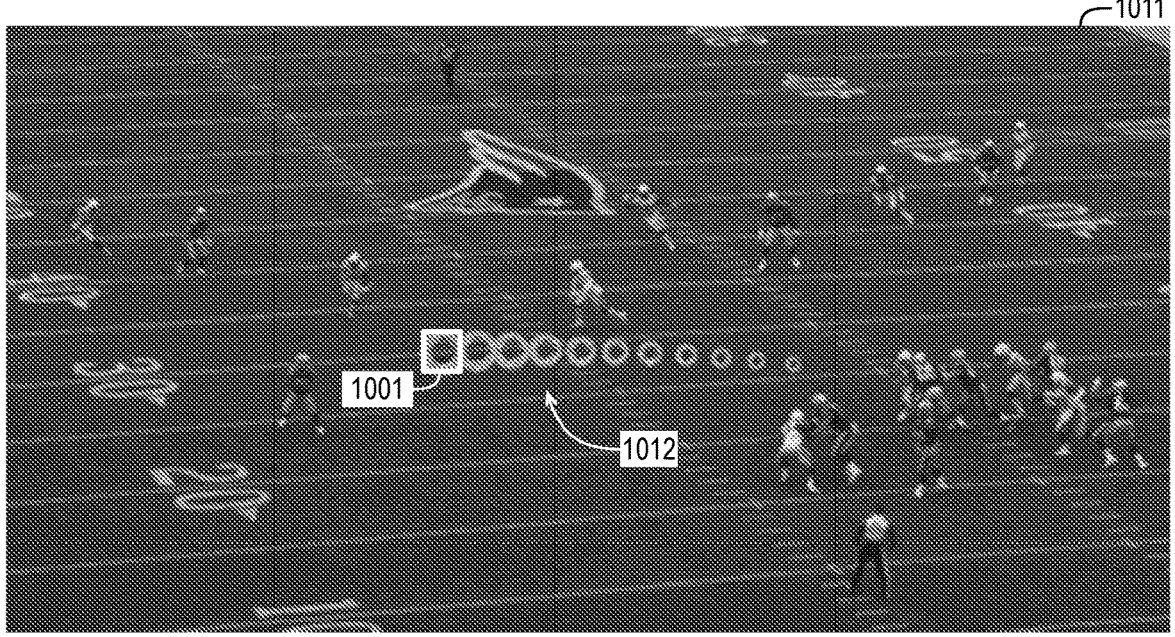
FIG. 10 illustrates example object tracking.

FIG. 10 illustrates example object tracking 1000, arranged in accordance with at least some implementations of the present disclosure. In FIG. 10, a current captured 2D image 1011 for a particular time instance, t, is illustrated with several object instances 1012 from previous time instances (e.g., t−1, t−2, . . . , t−10) also illustrated using object areas 1012 (illustrated as rings). Notably, the object of interest corresponding to object areas 1012 may be tracked (and detected) across time instances in previous captured 2D images such that the location of the object of interest in current captured 2D image 1011 may be predicted to aid object detection. Such techniques are particularly useful for fast moving objects such as balls or other sports objects. As shown, based on the illustrated object tracking and object detection of current captured 2D image 1011, a bounding box 1001 for the object of interest for current captured 2D image 1011 may be generated and used for validation of a 3D model by comparison of the image region of bounding box 1001 in current captured 2D image 1011 and the image region of bounding box 1001 in a reconstructed 2D image corresponding to current captured 2D image 1011.

Figure 11:
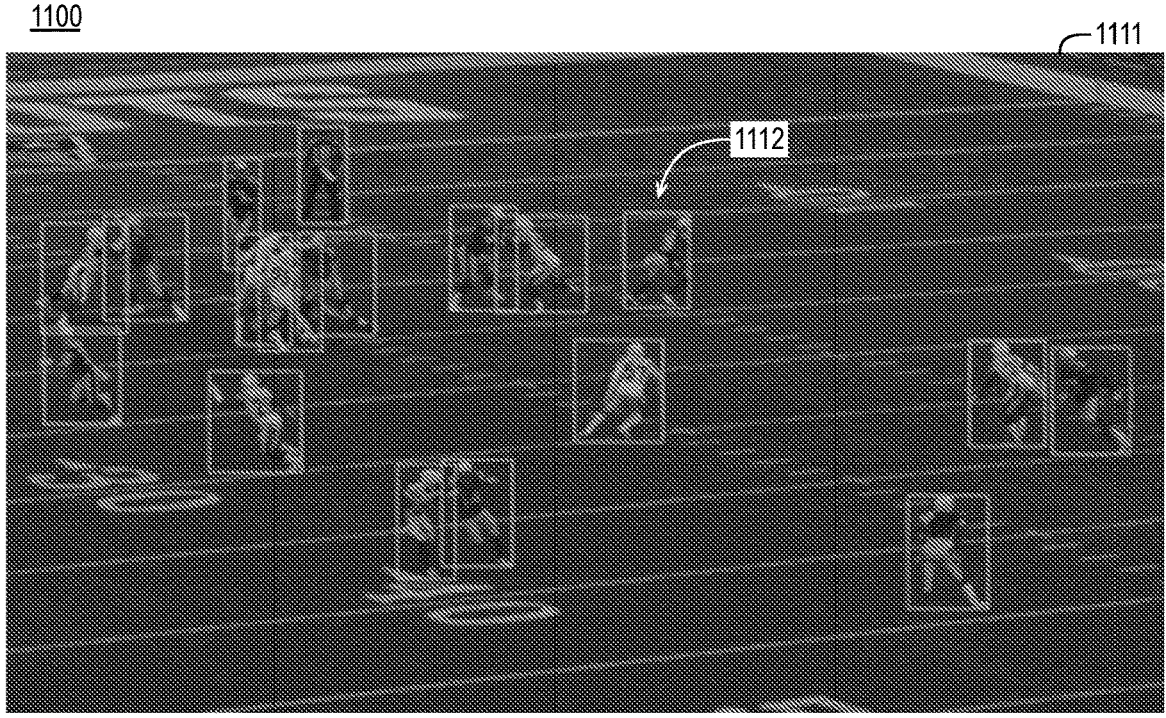
FIG. 11 illustrates example person detection.

FIG. 11 illustrates example person detection 1100, arranged in accordance with at least some implementations of the present disclosure. In FIG. 11, a current captured 2D image 1111 for a particular time instance, t, is illustrated with several persons being detected therein such that each person is within a bounding box as illustrated with respect to bounding box 1112. Notably, a person as an object of interest may be detected using any suitable technique or techniques such as YOLO or SSD to generate several instances of detected persons. As discussed, based on the illustrated person detection within current captured 2D image 1111, bounding boxes may be generated and used for validation of a 3D model by comparison of the image region of each bounding box 1112 in current captured 2D image 1111 and the image region of each bounding box 1112 in a reconstructed 2D image corresponding to current captured 2D image 1111. In some embodiments, other current captured 2D images (e.g., simultaneously captured images) having the object of interest such as the person within bounding box 1112 are also used to validate the 3D model by comparing all such image regions having the person between current captured 2D images and their counterpart reconstructed 2D images.

Figure 12:
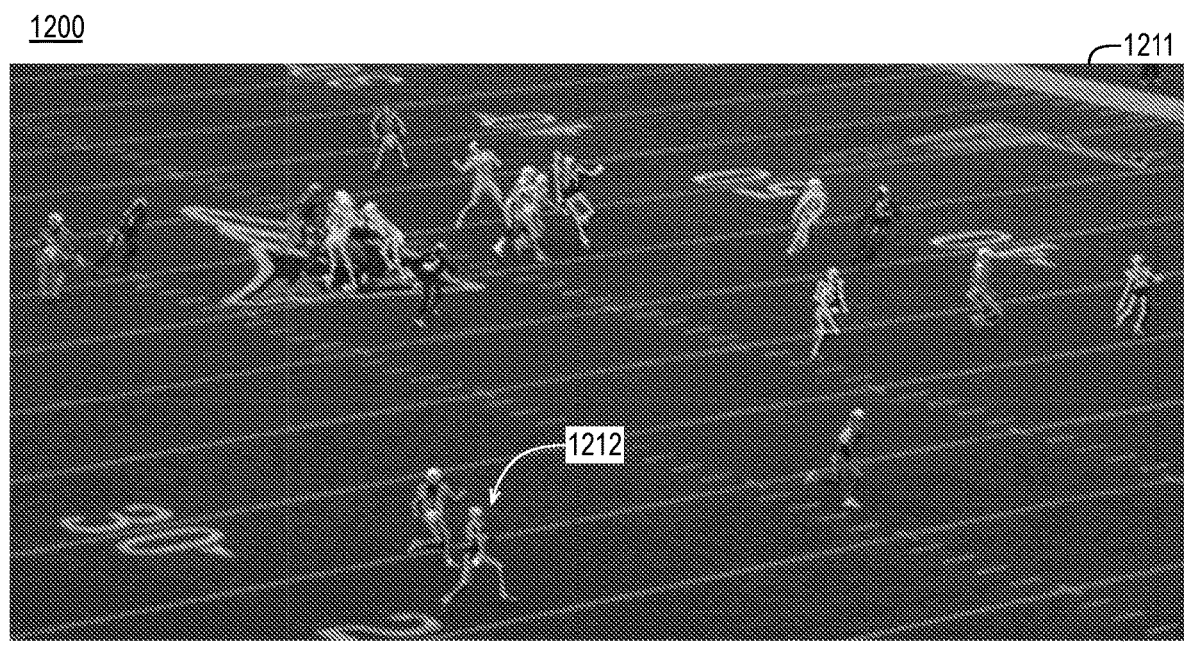
FIG. 12 illustrates example person pose detection.

FIG. 12 illustrates example person pose detection 1200, arranged in accordance with at least some implementations of the present disclosure. In FIG. 12, a current captured 2D image 1211 for a particular time instance, t, is illustrated with the poses of several persons being detected therein such that each person has a skeleton pose as illustrated with respect to skeleton pose 1212. Notably, a person as an object of interest may be detected and a corresponding pose skeleton or similar data structure may be generated using any suitable technique or techniques. As discussed, based on the illustrated pose detection within current captured 2D image 1211, pose data (e.g., pose elements and/or locations) for each detected pose or bounding boxes containing a pose may be generated and used for validation of a 3D model by comparison of the image region of each pose 1212 in current captured 2D image 1111 and the corresponding pose in a reconstructed 2D image corresponding to current captured 2D image 1111. Such techniques may include comparing the elements of each pose to find missing elements or generating a measure of pose position difference and comparing either (number of missing elements or pose position difference measure) to a threshold. In some embodiments, other current captured 2D images (e.g., simultaneously captured images) having the person may also be used to generate pose data and validate the 3D model by comparing all such poses having the person between current captured 2D images and their counterpart reconstructed 2D images.

Figure 13:
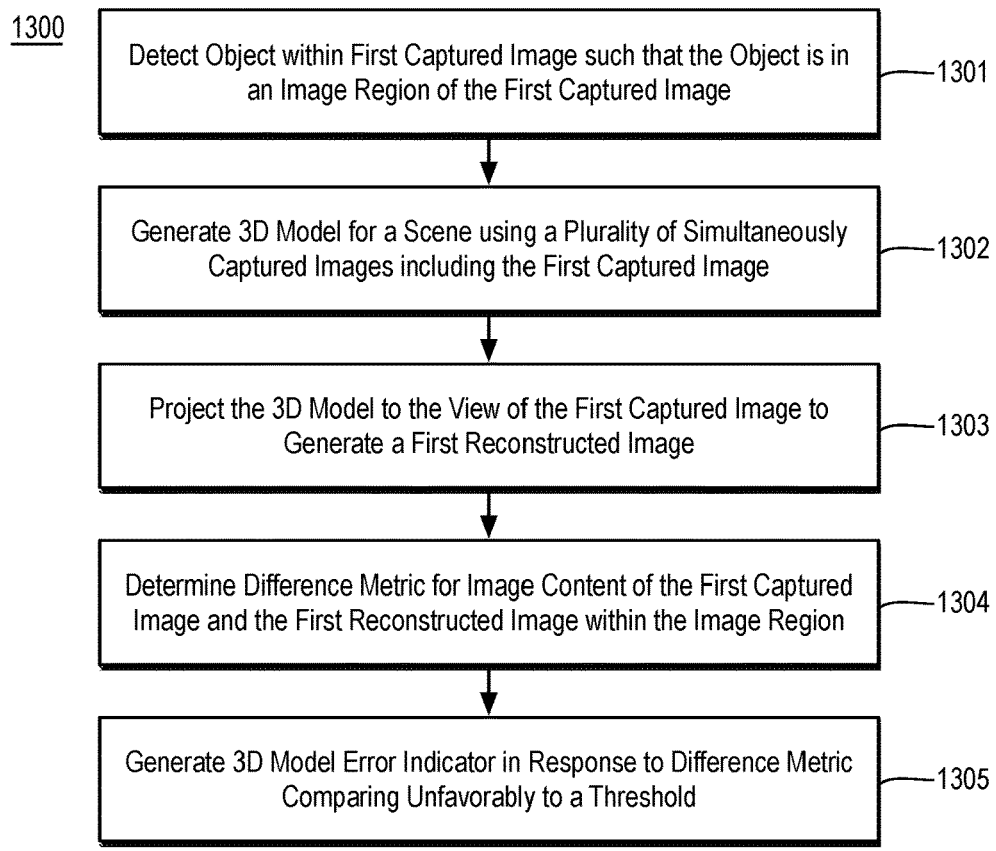
FIG. 13 is a flow diagram illustrating an example process for validating a 3D model of a scene.

FIG. 13 is a flow diagram illustrating an example process 1300 for validating a 3D model of a scene, arranged in accordance with at least some implementations of the present disclosure. Process 1300 may include one or more operations 1301-1305 as illustrated in FIG. 13. Process 1300 may form at least part of an image based 3D model validation process. By way of non-limiting example, process 1300 may form at least part of a 3D model validation process as performed by apparatus 100 as discussed herein. Furthermore, process 1300 will be described herein with reference to system 1400 of FIG. 13.

Figure 14:
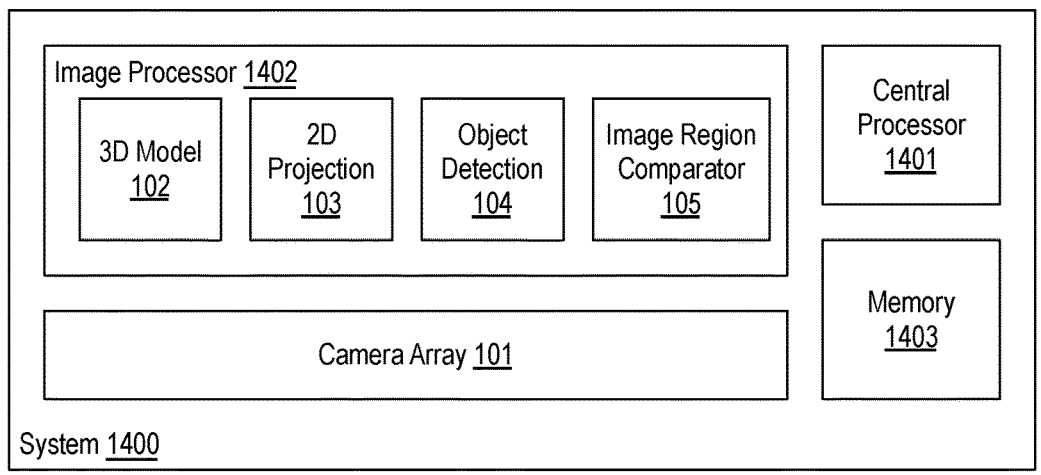
FIG. 14 is an illustrative diagram of an example system for validating a 3D model of a scene.

FIG. 14 is an illustrative diagram of an example system 1400 for validating a 3D model of a scene, arranged in accordance with at least some implementations of the present disclosure. As shown in FIG. 13, system 1400 may include a central processor 1401, an image processor 1402, a memory 1403, and camera array 101. Also as shown, image processor 1402 may include or implement 3D model module 102, 2D projection module 103, object detection module 104, and image region comparator 105. In the example of system 1400, memory 1403 may store image or frame data, 2D captured images, 2D reconstructed images, 3D point clouds, 3D models, bounding boxes, 3D model error indicators or data, or any other data discussed herein.

As shown, in some examples, one or more or portions of 3D model module 102, 2D projection module 103, object detection module 104, and image region comparator 105 are implemented via image processor 1402. In other examples, one or more or portions of 3D model module 102, 2D projection module 103, object detection module 104, and image region comparator 105 are implemented via central processor 1401, an image processing unit, an image processing pipeline, an image signal processor, or the like. In some examples, one or more or portions of 3D model module 102, 2D projection module 103, object detection module 104, and image region comparator 105 are implemented in hardware as a system-on-a-chip (SoC). In some examples, one or more or portions of 3D model module 102, 2D projection module 103, object detection module 104, and image region comparator 105 are implemented in hardware via a FPGA.

Image processor 1402 may include any number and type of image or graphics processing units that may provide the operations as discussed herein. Such operations may be implemented via software or hardware or a combination thereof. For example, image processor 1402 may include circuitry dedicated to manipulate and/or analyze images obtained from memory 1403. Central processor 1401 may include any number and type of processing units or modules that may provide control and other high level functions for system 1400 and/or provide any operations as discussed herein. Memory 1403 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1403 may be implemented by cache memory. In an embodiment, one or more or portions of 3D model module 102, 2D projection module 103, object detection module 104, and image region comparator 105 are implemented via an execution unit (EU) of image processor 1402. The EU may include, for example, programmable logic or circuitry such as a logic core or cores that may provide a wide array of programmable logic functions. In an embodiment, one or more or portions of 3D model module 102, 2D projection module 103, object detection module 104, and image region comparator 105 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 13, process 1300 begins at operation 1301, where an object is detected within a first captured image attained via a first camera of a plurality of cameras trained on a scene such that the object is detected within an image region of the first captured image and such that the first captured image comprises one of multiple simultaneously captured images of the scene. The object may be detected using any suitable technique or techniques such as YOLO, SSD, object tracking, etc. In an embodiment, detecting the object within the image region includes performing object detection on the first captured image to detect the object and an image region and adjusting a location of the image region within the first captured image using a geometric constraint based on detection of the object within one or more of the plurality of simultaneously captured images of the scene.

Processing continues at operation 1302, where, based on the simultaneously captured images, a 3D model of the scene is generated for a time instance corresponding to the simultaneously captured images. The 3D model may be generated using any suitable technique or techniques such as 2D image segmentation and 3D reconstruction to generate a point cloud and subsequent rendering or painting to generate a 3D model having texture.

Processing continues at operation 1303, where the 3D model is projected to a view of the first camera relative to the scene to generate a first reconstructed image representative of the scene from the view of the first camera at the first time instance. Notably, the first captured image and the first reconstructed image share the same view of the scene and are in the same coordinate system. The 3D model projection may be performed using any suitable technique or techniques such as using a camera projection matrix to determine the first reconstructed image from the 3D model.

Processing continues at operation 1304, where a difference metric is determined based on a comparison of first image content of the first captured image within the image region and second image content of the first reconstructed image within the image region. Although discussed herein with respect to a difference metric for the sake of clarity of presentation, a similarity metric may also be employed such that a difference metric provides a scalar value based on differences between image content and a similarity metric provides a scalar value based on the similarity of the image content. For example, such difference or similarity metrics may be characterized as comparison metrics that may be employed to measure the similarity/difference between image content as discussed herein with respect to measuring differences between image content.

The difference metric may be generated using any suitable technique or techniques. In some embodiments, the difference metric includes one or more of a pixel by pixel comparison of pixel values of the first and second image content, a shape comparison of shapes detected within the first and second image content, or a human pose comparison of human poses detected within the first and second image content. In an embodiment, the image region is a bounding box having coordinates in the first captured image and determining the difference metric includes applying the same bounding box coordinates to the first captured image and the first reconstructed image to determine the corresponding first and second image content.

Processing continues at operation 1305, where a 3D model error indicator is generated in response to the difference metric comparing unfavorably to a threshold. For example, when the measure of image content difference exceeds a threshold, a model error indicator and/or model error data are provided. As discussed, in some embodiments, a 3D model error indicator is generated in response to a detected difference based on a single pair of images (i.e., one captured image and one reconstructed image). In some embodiments, process 1300 further includes detecting a plurality of second image regions each corresponding to the object as detected in the remaining simultaneously captured images of the scene, projecting the 3D model to each view of the remaining plurality of cameras to generate second reconstructed images representative of the scene from the views of the remaining cameras, and determining a plurality of second difference metrics based on comparisons of each corresponding image content of the second image regions within the captured images and the reconstructed images, such that generating the 3D model error indicator is further in response to the plurality of second difference metrics. For example, the 3D model error indicator may be generated in response to an average of the difference metric and the second difference metrics exceeding a second threshold.

In some embodiments, process 1300 further includes detecting a second object within a second image region of the first captured image, determining a second difference metric based on a comparison of third image content of the first captured image within the third image region and fourth image content of the first reconstructed image within the second image region, and generating a second 3D model error indicator in response to the second difference metric being greater than a second threshold, such that the difference metric comparing unfavorably to the threshold comprises the difference metric being greater than the threshold, and such that the threshold is less than the second threshold in response to the image region being closer to a center of the first captured image than the second image region. For example, the threshold or a normalized threshold may be varied based on the location of the image region within an image. In an embodiment, the threshold and the second threshold are determined by applying a monotonically increasing function to a distance from image center of the image region and the second image region.

In some embodiments, process 1300 further includes detecting a plurality of second objects within corresponding second image regions of the first captured image, determining a second difference metric based on a comparison of third image content of the first captured image within an individual image region of the second image regions and fourth image content of the first reconstructed image within the individual image region, and generating a second 3D model error indicator in response to the second difference metric being greater than a second threshold, such that the difference metric comparing unfavorably to the threshold comprises the difference metric being greater than the threshold, and such that the threshold is greater than the second threshold in response to the image region having a lower image region density than the individual image region of the second image regions. For example, the threshold or a normalized threshold may be varied based on a detected object density. In an embodiment, the threshold and the second threshold are determined by applying a monotonically decreasing function to an image region density of the image region and the individual image region of the second image regions.

Process 1300 may be repeated any number of times either in series or in parallel for any number of input images, video frames, or the like. Process 1300 provides for 3D model validation that is automated, computationally efficient, and accurate in error detection.

Process 1300 may be implemented by any suitable device, system, or platform such as those discussed herein. In an embodiment, process 1300 is implemented by an apparatus having a memory to store images, as well as any other discussed data structure, and a processor to perform operations 1301-1305. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 15:
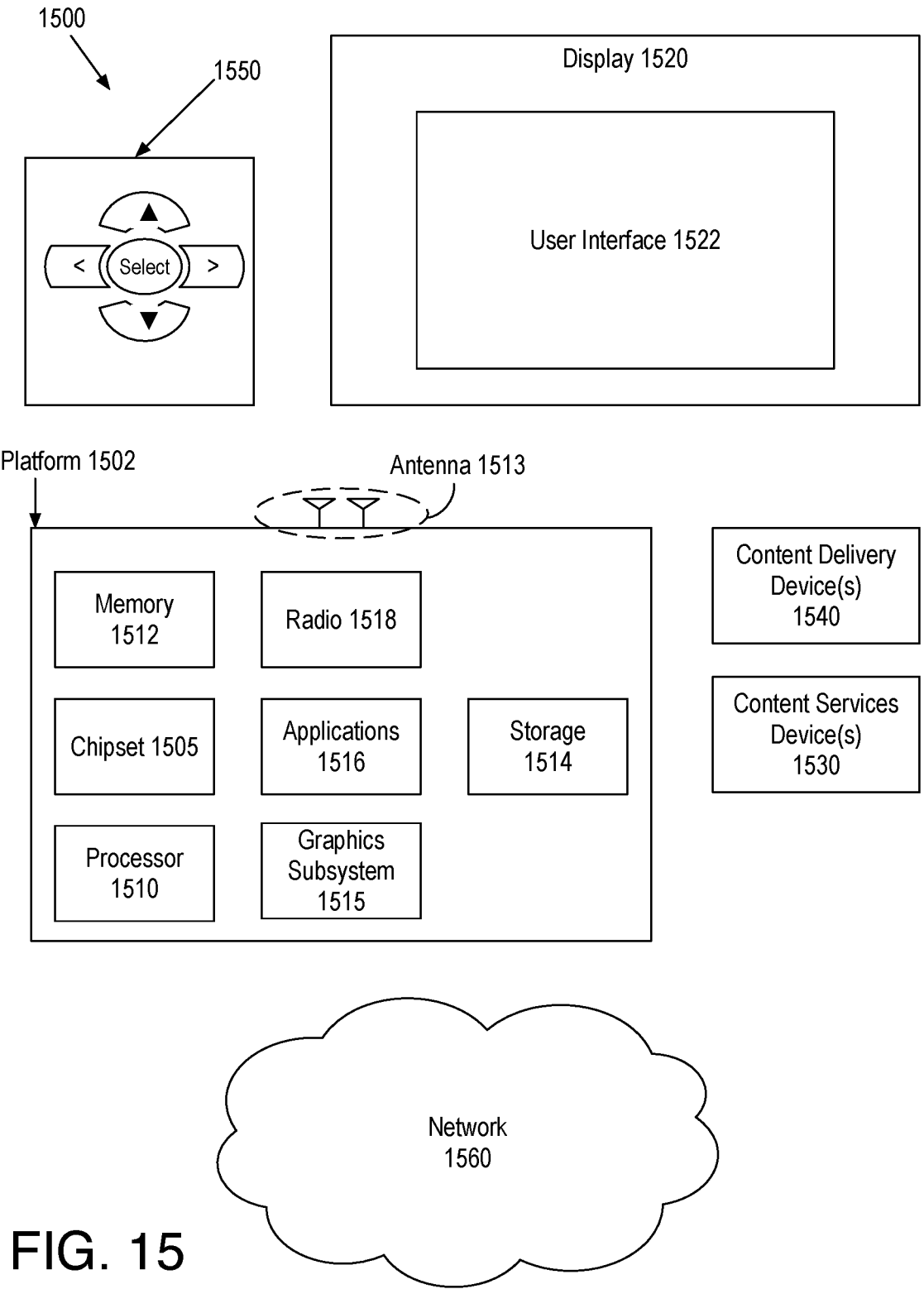
FIG. 15 is an illustrative diagram of an example system.

FIG. 15 is an illustrative diagram of an example system 1500, arranged in accordance with at least some implementations of the present disclosure. In various implementations, system 1500 may be a mobile device system although system 1500 is not limited to this context. For example, system 1500 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1500 includes a platform 1502 coupled to a display 1520. Platform 1502 may receive content from a content device such as content services device(s) 1530 or content delivery device(s) 1540 or other content sources such as image sensors 1519. For example, platform 1502 may receive image data as discussed herein from image sensors 1519 or any other content source. A navigation controller 1550 including one or more navigation features may be used to interact with, for example, platform 1502 and/or display 1520. Each of these components is described in greater detail below.

In various implementations, platform 1502 may include any combination of a chipset 1505, processor 1510, memory 1512, antenna 1513, storage 1514, graphics subsystem 1515, applications 1516, image signal processor 1517 and/or radio 1518. Chipset 1505 may provide intercommunication among processor 1510, memory 1512, storage 1514, graphics subsystem 1515, applications 1516, image signal processor 1517 and/or radio 1518. For example, chipset 1505 may include a storage adapter (not depicted) capable of providing intercommunication with storage 1514.

Processor 1510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1510 may be dual-core processor(s), dual-core mobile processor(s), and so forth.

Memory 1512 may be implemented as a volatile memory device such as, but not limited to, a Random Access Memory (RAM), Dynamic Random Access Memory (DRAM), or Static RAM (SRAM).

Storage 1514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1514 may include technology to increase the storage performance enhanced protection for valuable digital media when multiple hard drives are included, for example.

Image signal processor 1517 may be implemented as a specialized digital signal processor or the like used for image processing. In some examples, image signal processor 1517 may be implemented based on a single instruction multiple data or multiple instruction multiple data architecture or the like. In some examples, image signal processor 1517 may be characterized as a media processor. As discussed herein, image signal processor 1517 may be implemented based on a system on a chip architecture and/or based on a multi-core architecture.

Graphics subsystem 1515 may perform processing of images such as still or video for display. Graphics subsystem 1515 may be a graphics processing unit (GPU) or a visual processing unit (VPU), for example. An analog or digital interface may be used to communicatively couple graphics subsystem 1515 and display 1520. For example, the interface may be any of a High-Definition Multimedia Interface, DisplayPort, wireless HDMI, and/or wireless HD compliant techniques. Graphics subsystem 1515 may be integrated into processor 1510 or chipset 1505. In some implementations, graphics subsystem 1515 may be a stand-alone device communicatively coupled to chipset 1505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1518 may operate in accordance with one or more applicable standards in any version.

In various implementations, display 1520 may include any television type monitor or display. Display 1520 may include, for example, a computer display screen, touch screen display, video monitor, television-like device, and/or a television. Display 1520 may be digital and/or analog. In various implementations, display 1520 may be a holographic display. Also, display 1520 may be a transparent surface that may receive a visual projection. Such projections may convey various forms of information, images, and/or objects. For example, such projections may be a visual overlay for a mobile augmented reality (MAR) application. Under the control of one or more software applications 1516, platform 1502 may display user interface 1522 on display 1520.

In various implementations, content services device(s) 1530 may be hosted by any national, international and/or independent service and thus accessible to platform 1502 via the Internet, for example. Content services device(s) 1530 may be coupled to platform 1502 and/or to display 1520. Platform 1502 and/or content services device(s) 1530 may be coupled to a network 1560 to communicate (e.g., send and/or receive) media information to and from network 1560. Content delivery device(s) 1540 also may be coupled to platform 1502 and/or to display 1520.

Image sensors 1519 may include any suitable image sensors that may provide image data based on a scene. For example, image sensors 1519 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1519 may include any device that may detect information of a scene to generate image data.

In various implementations, content services device(s) 1530 may include a cable television box, personal computer, network, telephone, Internet enabled devices or appliance capable of delivering digital information and/or content, and any other similar device capable of uni-directionally or bi-directionally communicating content between content providers and platform 1502 and/display 1520, via network 1560 or directly. It will be appreciated that the content may be communicated uni-directionally and/or bi-directionally to and from any one of the components in system 1500 and a content provider via network 1560. Examples of content may include any media information including, for example, video, music, medical and gaming information, and so forth.

Content services device(s) 1530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1502 may receive control signals from navigation controller 1550 having one or more navigation features. The navigation features of navigation controller 1550 may be used to interact with user interface 1522, for example. In various embodiments, navigation controller 1550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1550 may be replicated on a display (e.g., display 1520) by movements of a pointer, cursor, focus ring, or other visual indicators displayed on the display. For example, under the control of software applications 1516, the navigation features located on navigation controller 1550 may be mapped to virtual navigation features displayed on user interface 1522, for example. In various embodiments, navigation controller 1550 may not be a separate component but may be integrated into platform 1502 and/or display 1520. The present disclosure, however, is not limited to the elements or in the context shown or described herein.

In various implementations, drivers (not shown) may include technology to enable users to instantly turn on and off platform 1502 like a television with the touch of a button after initial boot-up, when enabled, for example. Program logic may allow platform 1502 to stream content to media adaptors or other content services device(s) 1530 or content delivery device(s) 1540 even when the platform is turned "off." In addition, chipset 1505 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1500 may be integrated. For example, platform 1502 and content services device(s) 1530 may be integrated, or platform 1502 and content delivery device(s) 1540 may be integrated, or platform 1502, content services device(s) 1530, and content delivery device(s) 1540 may be integrated, for example. In various embodiments, platform 1502 and display 1520 may be an integrated unit. Display 1520 and content service device(s) 1530 may be integrated, or display 1520 and content delivery device(s) 1540 may be integrated, for example. These examples are not meant to limit the present disclosure.

In various embodiments, system 1500 may be implemented as a wireless system, a wired system, or a combination of both. When implemented as a wireless system, system 1500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 15.

Figure 16:
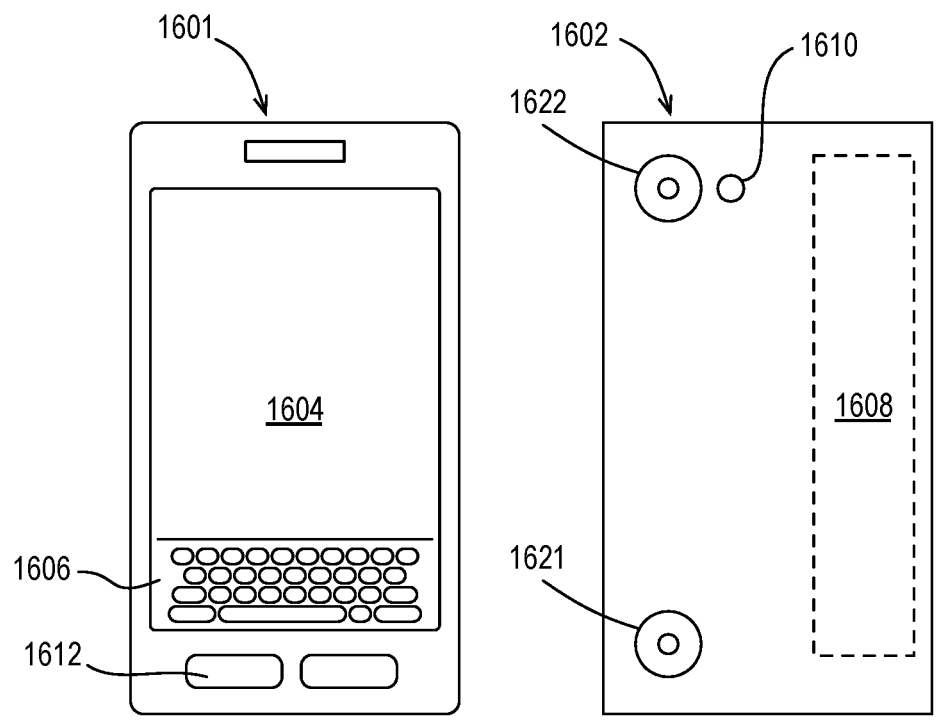
FIG. 16 illustrates an example device, all arranged in accordance with at least some implementations of the present disclosure.

As described above, system 1500 may be embodied in varying physical styles or form factors. FIG. 16 illustrates an example small form factor device 1600, arranged in accordance with at least some implementations of the present disclosure. In some examples, system 1500 may be implemented via device 1600. In other examples, other systems, components, or modules discussed herein or portions thereof may be implemented via device 1600. In various embodiments, for example, device 1600 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 16, device 1600 may include a housing with a front 1601 and a back 1602. Device 1600 includes a display 1604, an input/output (I/O) device 1606, a color camera 1621, a color camera 1622, an infrared transmitter 1623, and an integrated antenna 1608. In some embodiments, color camera 1621 and color camera 1622 attain planar images as discussed herein. In some embodiments, device 1600 does not include color camera 1621 and 1622 and device 1600 attains input image data (e.g., any input image data discussed herein) from another device. Device 1600 also may include navigation features 1612. I/O device 1606 may include any suitable I/O device for entering information into a mobile computing device. Examples for I/O device 1606 may include an alphanumeric keyboard, a numeric keypad, a touch pad, input keys, buttons, switches, microphones, speakers, voice recognition device and software, and so forth. Information also may be entered into device 1600 by way of microphone (not shown), or may be digitized by a voice recognition device. As shown, device 1600 may include color cameras 1621, 1622, and a flash 1610 integrated into back 1602 (or elsewhere) of device 1600. In other examples, color cameras 1621, 1622, and flash 1610 may be integrated into front 1601 of device 1600 or both front and back sets of cameras may be provided. Color cameras 1621, 1622 and a flash 1610 may be components of a camera module to originate color image data with IR texture correction that may be processed into an image or streaming video that is output to display 1604 and/or communicated remotely from device 1600 via antenna 1608 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for validating a 3D model comprises detecting an object within a first captured image attained via a first camera of a plurality of cameras trained on a scene, wherein the object is detected within an image region of the first captured image, and wherein the first captured image comprises one of a plurality of simultaneously captured images of the scene, generating, based on the simultaneously captured images, a 3D model of the scene for a time instance corresponding to the simultaneously captured images, determining a difference metric based on a comparison of first image content of the first captured image within the image region and second image content of the first reconstructed image within the image region, and generating a 3D model error indicator in response to the difference metric comparing unfavorably to a threshold.

In one or more second embodiments, further to the first embodiments, the difference metric comprises one of a pixel by pixel comparison of pixel values of the first and second image content, a shape comparison of shapes detected within the first and second image content, or a human pose comparison of human poses detected within the first and second image content.

In one or more third embodiments, further to the first or second embodiments, the image region comprises a bounding box having coordinates in the first captured image and determining the difference metric comprises applying the same bounding box coordinates to the first captured image and the first reconstructed image to determine the corresponding first and second image content.

In one or more fourth embodiments, further to the first through third embodiments, the method further comprises detecting a plurality of second image regions each corresponding to the object as detected in the remaining simultaneously captured images of the scene, projecting the 3D model to each view of the remaining plurality of cameras to generate second reconstructed images representative of the scene from the views of the remaining cameras, and determining a plurality of second difference metrics based on comparisons of each corresponding image content of the second image regions within the captured images and the reconstructed images, wherein generating the 3D model error indicator is further in response to the plurality of second difference metrics.

In one or more fifth embodiments, further to the first through fourth embodiments, the 3D model error indicator is generated in response to an average of the difference metric and the second difference metrics exceeding a second threshold.

In one or more sixth embodiments, further to the first through fifth embodiments, the method further comprises detecting a second object within a second image region of the first captured image, determining a second difference metric based on a comparison of third image content of the first captured image within the third image region and fourth image content of the first reconstructed image within the second image region, and generating a second 3D model error indicator in response to the second difference metric being greater than a second threshold, wherein the difference metric comparing unfavorably to the threshold comprises the difference metric being greater than the threshold, and wherein the threshold is less than the second threshold in response to the image region being closer to a center of the first captured image than the second image region.

In one or more seventh embodiments, further to the first through sixth embodiments, the threshold and the second threshold are determined by applying a monotonically increasing function to a distance from image center of the image region and the second image region.

In one or more eighth embodiments, further to the first through seventh embodiments, the method further comprises detecting a plurality of second objects within corresponding second image regions of the first captured image, determining a second difference metric based on a comparison of third image content of the first captured image within an individual image region of the second image regions and fourth image content of the first reconstructed image within the individual image region, and generating a second 3D model error indicator in response to the second difference metric being greater than a second threshold, wherein the difference metric comparing unfavorably to the threshold comprises the difference metric being greater than the threshold, and wherein the threshold is greater than the second threshold in response to the image region having a lower image region density than the individual image region of the second image regions.

In one or more ninth embodiments, further to the first through eighth embodiments, the threshold and the second threshold are determined by applying a monotonically decreasing function to an image region density of the image region and the individual image region of the second image regions.

In one or more tenth embodiments, further to the first through ninth embodiments, detecting the object within the image region comprises performing object detection on the first captured image to detect the object and an image region and adjusting a location of the image region within the first captured image using a geometric constraint based on detection of the object within one or more of the plurality of simultaneously captured images of the scene.

In one or more eleventh embodiments, a device or system includes a memory and a processor to perform a method according to any one of the above embodiments.

In one or more twelfth embodiments, at least one machine readable medium includes a plurality of instructions that in response to being executed on a computing device, cause the computing device to perform a method according to any one of the above embodiments.

In one or more thirteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus for validating a 3D model, comprising:
a memory to store a first captured image attained via a first camera of a plurality of cameras trained on a scene; and
a processor coupled to the memory, the processor to:
detect an object within an image region of the first captured image, wherein the first captured image comprises one of a plurality of simultaneously captured images of the scene at a first time instance;
generate, based on the simultaneously captured images, a 3D model of the scene corresponding to the first time instance;
project the 3D model to a view of the first camera relative to the scene to generate a first reconstructed image representative of the scene from the view of the first camera at the first time instance;
evaluate representation of the object in the 3D model based on a difference metric, the difference metric based on a comparison of first image content of the first captured image within the image region and second image content of the first reconstructed image within the image region; and generate a 3D model error indicator in response to the difference metric comparing unfavorably to a threshold.

2. The apparatus of claim 1, wherein the difference metric comprises one of a pixel by pixel comparison of pixel values of the first and second image content, a shape comparison of shapes detected within the first and second image content, or a human pose comparison of human poses detected within the first and second image content.

3. The apparatus of claim 1, wherein the image region comprises a bounding box having coordinates in the first captured image and the processor to determine the difference metric comprises the processor to apply the same bounding box coordinates to the first captured image and the first reconstructed image to determine the corresponding first and second image content.

4. The apparatus of claim 1, the processor further to:
detect a plurality of second image regions each corresponding to the object as detected in the remaining simultaneously captured images of the scene;
project the 3D model to each view of the remaining plurality of cameras to generate second reconstructed images representative of the scene from the views of the remaining cameras; and
determine a plurality of second difference metrics based on comparisons of each corresponding image content of the second image regions within the captured images and the reconstructed images, wherein the 3D model error indicator is further in response to the plurality of second difference metrics.

5. The apparatus of claim 4, wherein the 3D model error indicator is generated in response to an average of the difference metric and the second difference metrics exceeding a second threshold.

6. The apparatus of claim 1, the processor further to:
detect a second object within a second image region of the first captured image;
determine a second difference metric based on a comparison of third image content of the first captured image within the second image region and fourth image content of the first reconstructed image within the second image region; and
generate a second 3D model error indicator in response to the second difference metric being greater than a second threshold, wherein the difference metric comparing unfavorably to the threshold comprises the difference metric being greater than the threshold, and wherein the threshold is less than the second threshold in response to the image region being closer to a center of the first captured image than the second image region or the threshold is greater than the second threshold in response to the image region having a lower image region density than the second image region.

7. The apparatus of claim 6, wherein the threshold and the second threshold are determined by application of a monotonically increasing function to a distance from image center of the image region and the second image region or by application of a monotonically decreasing function to an image region density of the image region and the second image region.

8. The apparatus of claim 1, wherein the processor to evaluate representation of the object in the 3D model comprises the processor to determine the object is not represented in the 3D model.

9. The apparatus of claim 1, wherein the processor to detect the object within the image region comprises the processor to:
perform object detection on the first captured image to detect the object and an image region; and
adjust a location of the image region within the first captured image using a geometric constraint based on detection of the object within one or more of the plurality of simultaneously captured images of the scene.

10. A method for validating a 3D model comprising:
detecting an object within an image region of a first captured image attained via a first camera of a plurality of cameras trained on a scene, wherein the first captured image comprises one of a plurality of simultaneously captured images of the scene at a first time instance;
generating, based on the simultaneously captured images, a 3D model of the scene corresponding to the first time instance;
projecting the 3D model to a view of the first camera relative to the scene to generate a first reconstructed image representative of the scene from the view of the first camera at the first time instance;
evaluating representation of the object in the 3D model based on a difference metric, the difference metric based on a comparison of first image content of the first captured image within the image region and second image content of the first reconstructed image within the image region; and
generating a 3D model error indicator in response to the difference metric comparing unfavorably to a threshold.

11. The method of claim 10, wherein the difference metric comprises one of a pixel by pixel comparison of pixel values of the first and second image content, a shape comparison of shapes detected within the first and second image content, or a human pose comparison of human poses detected within the first and second image content.

12. The method of claim 10, further comprising:
detecting a plurality of second image regions each corresponding to the object as detected in the remaining simultaneously captured images of the scene;
projecting the 3D model to each view of the remaining plurality of cameras to generate second reconstructed images representative of the scene from the views of the remaining cameras; and
determining a plurality of second difference metrics based on comparisons of each corresponding image content of the second image regions within the captured images and the reconstructed images, wherein generating the 3D model error indicator is further in response to the plurality of second difference metrics.

13. The method of claim 10, further comprising:
detecting a second object within a second image region of the first captured image;
determining a second difference metric based on a comparison of third image content of the first captured image within the second image region and fourth image content of the first reconstructed image within the second image region; and
generating a second 3D model error indicator in response to the second difference metric being greater than a second threshold, wherein the difference metric comparing unfavorably to the threshold comprises the difference metric being greater than the threshold, and wherein the threshold is less than the second threshold in response to the image region being closer to a center of the first captured image than the second image region.

14. The method of claim 10, further comprising:
detecting a second object within a second image region of the first captured image;
determining a second difference metric based on a comparison of third image content of the first captured image within the second image region and fourth image content of the first reconstructed image within the second image region; and
generating a second 3D model error indicator in response to the second difference metric being greater than a second threshold, wherein the difference metric comparing unfavorably to the threshold comprises the difference metric being greater than the threshold, and wherein the threshold is greater than the second threshold in response to the image region having a lower image region density than the second image region.

15. At least one non-transitory machine readable medium comprising a plurality of instructions that, in response to being executed on a computing device, cause the computing device to validate a 3D model by:
detecting an object within an image region of a first captured image attained via a first camera of a plurality of cameras trained on a scene, wherein the first captured image comprises one of a plurality of simultaneously captured images of the scene at a first time instance;
generating, based on the simultaneously captured images, a 3D model of the scene corresponding to the first time instance;
projecting the 3D model to a view of the first camera relative to the scene to generate a first reconstructed image representative of the scene from the view of the first camera at the first time instance;
evaluating representation of the object in the 3D model based on a difference metric, the difference metric based on a comparison of first image content of the first captured image within the image region and second image content of the first reconstructed image within the image region; and
generating a 3D model error indicator in response to the difference metric comparing unfavorably to a threshold.

16. The non-transitory machine readable medium of claim 15, wherein the difference metric comprises one of a pixel by pixel comparison of pixel values of the first and second image content, a shape comparison of shapes detected within the first and second image content, or a human pose comparison of human poses detected within the first and second image content.

17. The non-transitory machine readable medium of claim 15, further comprising instructions that, in response to being executed on the computing device, cause the computing device to validate the 3D model by:
detecting a plurality of second image regions each corresponding to the object as detected in the remaining simultaneously captured images of the scene;
projecting the 3D model to each view of the remaining plurality of cameras to generate second reconstructed images representative of the scene from the views of the remaining cameras; and
determining a plurality of second difference metrics based on comparisons of each corresponding image content of the second image regions within the captured images and the reconstructed images, wherein generating the 3D model error indicator is further in response to the plurality of second difference metrics.

18. The non-transitory machine readable medium of claim 15, further comprising instructions that, in response to being executed on the computing device, cause the computing device to validate the 3D model by:
detecting a second object within a second image region of the first captured image;
determining a second difference metric based on a comparison of third image content of the first captured image within the second image region and fourth image content of the first reconstructed image within the second image region; and
generating a second 3D model error indicator in response to the second difference metric being greater than a second threshold, wherein the difference metric comparing unfavorably to the threshold comprises the difference metric being greater than the threshold, and wherein the threshold is less than the second threshold in response to the image region being closer to a center of the first captured image than the second image region.

19. The non-transitory machine readable medium of claim 15, further comprising instructions that, in response to being executed on the computing device, cause the computing device to validate the 3D model by:
detecting a second object within a second image region of the first captured image;
determining a second difference metric based on a comparison of third image content of the first captured image within the second image region and fourth image content of the first reconstructed image within the second image region; and
generating a second 3D model error indicator in response to the second difference metric being greater than a second threshold, wherein the difference metric comparing unfavorably to the threshold comprises the difference metric being greater than the threshold, and wherein the threshold is greater than the second threshold in response to the image region having a lower image region density than the second image region.

* * * * *